(12) United States Patent
Wang et al.

(10) Patent No.: US 9,201,247 B2
(45) Date of Patent: Dec. 1, 2015

(54) ELECTRICALLY SWITCHABLE LIGHT-MODULATING CELL WITH VIA FOR IMAGE DISPLAY APPARATUS

(71) Applicant: DELTA ELECTRONICS, INC., Taoyuan Hsien (TW)

(72) Inventors: Yeong-Feng Wang, Taoyuan Hsien (TW); Ching-Tung Hsu, Taoyuan Hsien (TW); Yen-I Chou, Taoyuan Hsien (TW); Chia-Yen Lee, Taoyuan Hsien (TW); Meng-Han Liu, Taoyuan Hsien (TW); Ming-Wei Tsai, Taoyuan Hsien (TW)

(73) Assignee: DELTA ELECTRONICS, INC., Taoyuan (TW)

(*) Notice: Subject to any disclaimer, the term of this patent is extended or adjusted under 35 U.S.C. 154(b) by 209 days.

(21) Appl. No.: 13/712,660

(22) Filed: Dec. 12, 2012

(65) Prior Publication Data
US 2014/0160554 A1    Jun. 12, 2014

(51) Int. Cl.
*G02B 27/22* (2006.01)
*G02B 26/00* (2006.01)
*G09G 3/00* (2006.01)

(52) U.S. Cl.
CPC .......... *G02B 27/2264* (2013.01); *G02B 26/005* (2013.01); *G09G 3/00* (2013.01)

(58) Field of Classification Search
CPC .......................... G02B 26/005; G02B 27/2264
USPC .......... 359/228, 290, 316, 245, 254, 237, 252, 359/259, 320, 318, 315, 298; 345/107, 105, 345/41, 60, 84
See application file for complete search history.

(56) References Cited

U.S. PATENT DOCUMENTS

2012/0194563 A1*   8/2012   Liang et al. .................... 359/316

* cited by examiner

Primary Examiner — Scott J Sugarman
Assistant Examiner — Ephrem Mebrahtu
(74) Attorney, Agent, or Firm — Muncy, Geissler, Olds & Lowe, P.C.

(57) ABSTRACT

Disclosed is an image display apparatus, including a display device displaying right-eye images and left-eye images. A light-modulating device attached to the display device; and a temperature sensor monitoring the light-modulating device temperature. The light-modulating device deflects the right-eye and left-eye images to an observer's right and left eyes respectively without a temperature variation in the temperature sensor.

23 Claims, 27 Drawing Sheets

ELECTRICALLY SWITCHABLE LIGHT-MODULATING CELL WITH VIA FOR IMAGE DISPLAY APPARATUS

BACKGROUND

1. Technique Field

The disclosure relates to an image display apparatus, and in particular relates to an electrically switchable light-modulating cell thereof and a method for driving the same.

2. Description of the Related Art

In 1875, Dr. Lippman discovered an electrowetting phenomenon. Thereafter, research and several applications utilizing the electrowetting technology were developed, e.g. displays, optical filters, optical fibers, adaptive lenses, adaptive passive devices such as capacitors, lab-on-chips, and spray coating. As shown in FIG. 1, a polar liquid (no applied voltage) on a hydrophobic dielectric layer appears to be contracted, thereby minimizing its Gibbs free energy. In a display with pixels smaller than 200 μm, the liquid droplet has a surface tension over 10,000 times that of gravity. In other words, the liquid droplet is stable in any direction. When a voltage is applied to the polar liquid, charges are distributed on the dielectric layer to attract the polar liquid. As such, the polar liquid is spread out to minimize the Gibbs free energy thereof. If a voltage applied to the polar liquid is larger, the polar liquid is spread out on the hydrophobic layer more. The manner of applying voltage to the polar liquid will be influenced by certain factors, e.g. the voltage, the thickness of the hydrophobic dielectric layer, the dielectric constant of the hydrophobic dielectric layer, and the surface tension between the polar liquid and the hydrophobic dielectric layer.

FIG. 2 shows curves of contact angles (between a polar liquid and a dielectric layer) versus voltages applied to the polar liquid. Although the theoretical curve can be calculated by the Young-Lippmann equation, the real curve should be obtained by experiments. In addition to the electric potential applied to the polar liquid, the surface tension, the interface interaction, the temperature, and the force of gravity also influence the behavior of the polar liquid. For effectively applying the electrowetting phenomenon, the characteristics of the polar liquid (such as the tilt angle of the liquid surface) should be exactly controlled. For achieving the above requirement, the disclosure provides an electric potential difference generator (e.g. discrete electrodes) to precisely control the liquid characteristics.

BRIEF SUMMARY

One embodiment of the disclosure provides an image display apparatus, comprising: a display device displaying right-eye images and left-eye images; a light-modulating device attached to the display device; and a temperature sensor monitoring the light-modulating device temperature, wherein the light-modulating device deflects the right-eye and left-eye images to an observer's right and left eyes respectively without a temperature variation in the temperature sensor.

One embodiment of the disclosure provides a method of outputting stereoscopic images, comprising: providing an image display apparatus, comprising a display device and a light-modulating device attached to the display device, wherein the display device alternately displays a right-eye image during a first period and a left-eye image during a second period; applying a first voltage to the light-modulating device to deflect the right-eye image to an observer's right eye during the first period; applying a second voltage to the light-modulating device to deflect the left-eye image to the observer's left eye during the second period; and applying a pulse voltage to the light-modulating device between the first period and the second period.

One embodiment of the disclosure provides an electrically switchable light-modulating cell, comprising: a first substrate; a partition wall, disposed on the first substrate; a second substrate, disposed on the partition wall and opposite to the first substrate, wherein the first substrate, the second substrate, and the partition wall define a compartment; a first and second light-modulating media fill the compartment, wherein the first and second light-modulating media are substantially immiscible and are of different refractive indices; and an electric potential difference generator, disposed on at least one of the first substrate, the partition wall, and the second substrate, wherein the electric potential difference generator provides a plurality of parallel potential lines distributed where the electric potential difference generator is located, wherein at least one of the first substrate, the second substrate, and the partition wall is wettable by at least one of the first and second light-modulating media.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
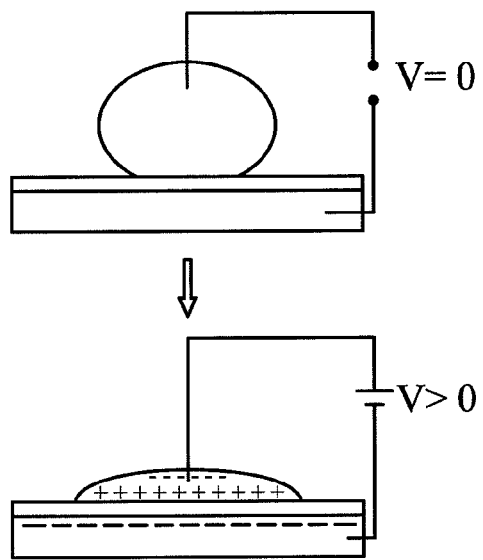
FIG. 1 shows an electrowetting phenomenon in related art.
Figure 2:
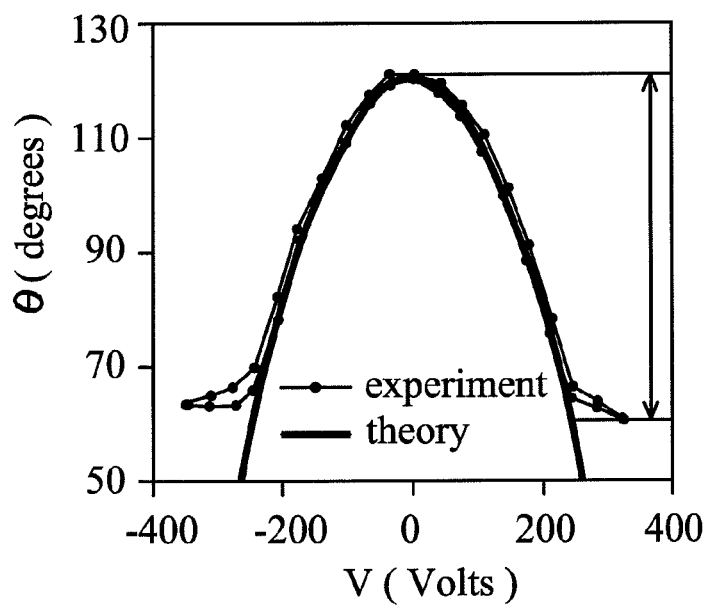
FIG. 2 shows curves of contact angles (between a polar liquid and a dielectric layer) versus voltages applied to the polar liquid.
Figure 3:
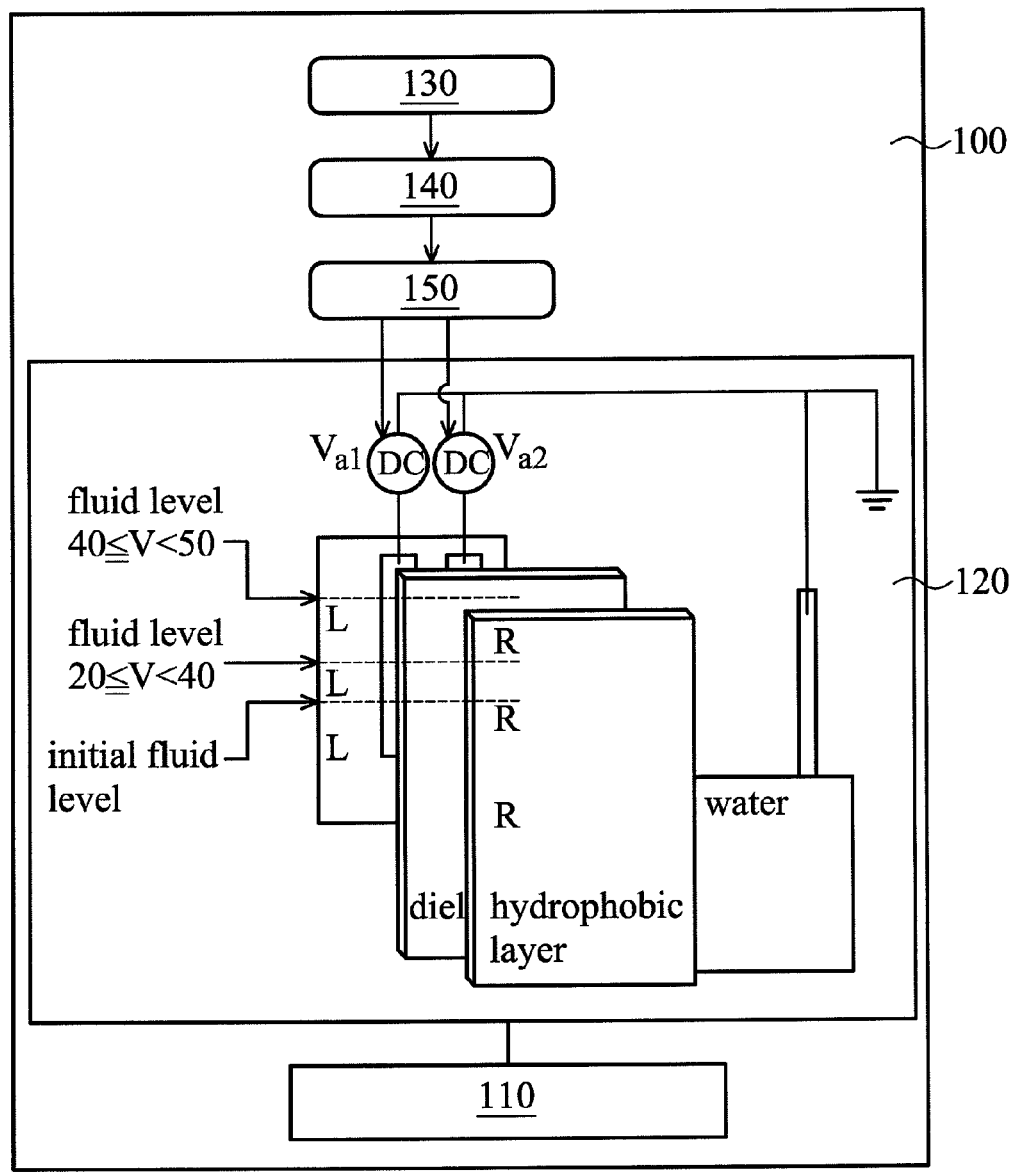
FIG. 3 shows an image display apparatus in one embodiment of the disclosure.

As shown in FIG. 3, an image display apparatus 100 includes a display device 110 for displaying right-eye images and left-eye images. A light-modulating device 120 attached to the display device 110, and a temperature sensor 130 monitoring the light-modulating device temperature. The light-modulating device 120 deflects the right-eye and left-eye images to an observer's right eye and left eye respectively without a temperature variation in the temperature sensor 130. In one embodiment, a thermostat (not shown) is connected to the light-modulating device 120 for keeping the temperature of the light-modulating device 120 at a constant level, such that the thermal expansion of the liquid in the light-modulating device is minimized. In another embodiment, the light-modulating device 120 is driven by a voltage corresponding to the variation in the temperature sensor 130. For example, temperature variations are monitored by the temperature sensor 130, and then calculated by the calculator 140, and then transferred to a controller 150 to determine the voltage for driving the light-modulating device 120. As such, the thermal expansion of the liquid in the light-modulating device 120 will not influence the light-modulating effect due to the controlled driving voltage.

Figure 4A:
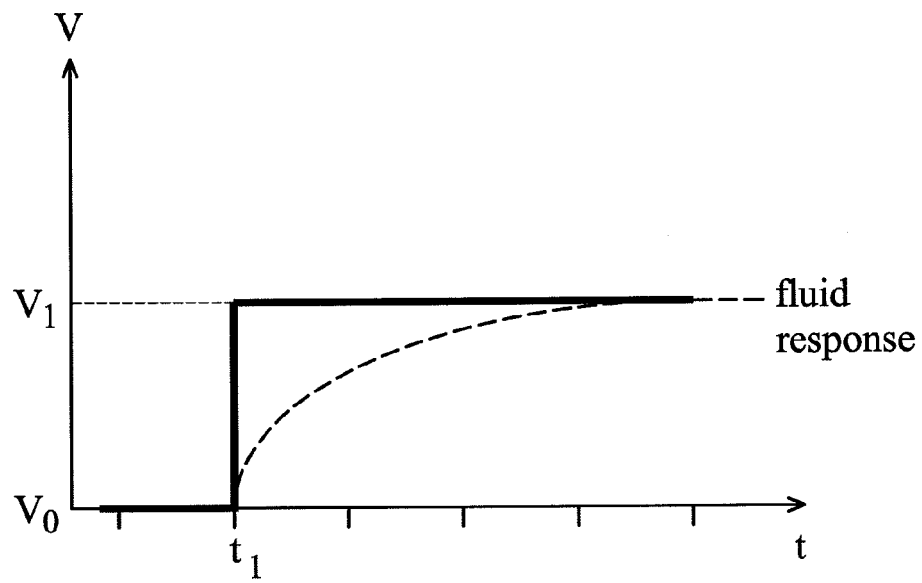
FIGS. 4A to 4D show line charts of voltage (applied to the light-modulating device) versus time in some embodiments of the disclosure.
Figure 4B:
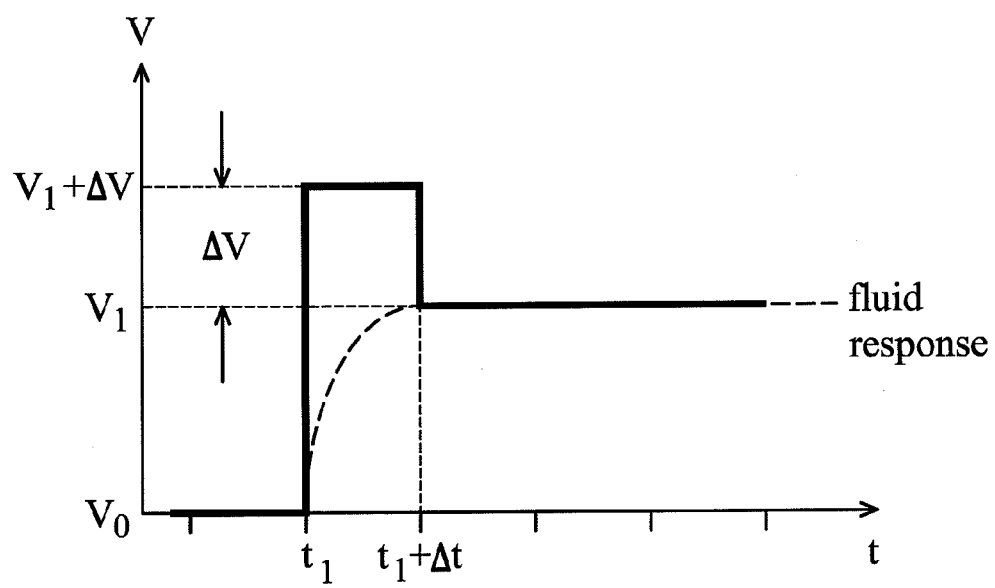
Figure 4C:
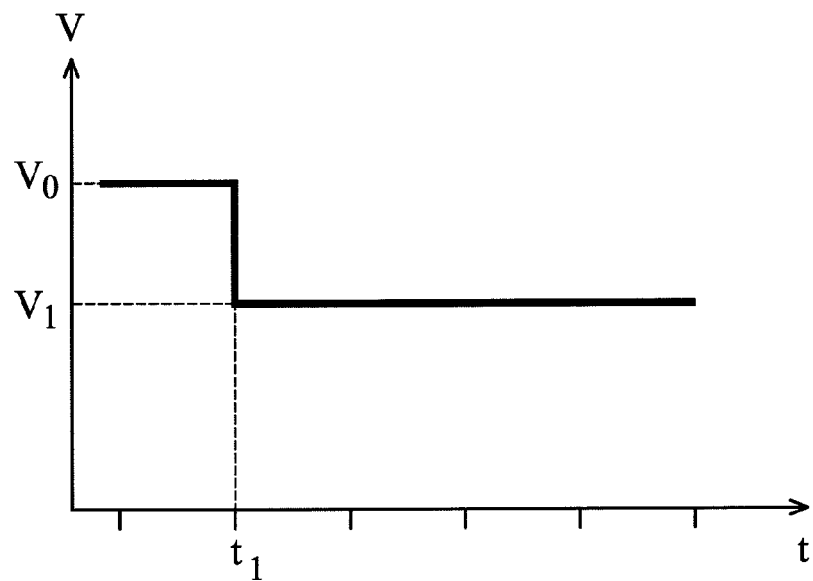
Figure 4D:
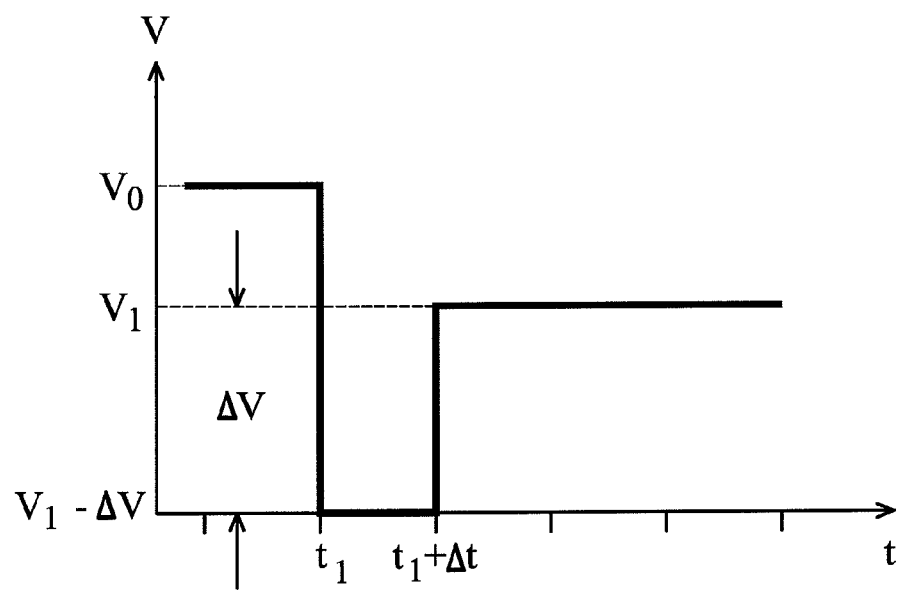

While stereoscopic images are output by the image display apparatus 100, the display device 110 alternately displays a right-eye image during a first period and a left-eye image during a second period. Furthermore, a first voltage V0 is applied to the light-modulating device 120 to deform a light-modulating medium therein for deflecting the right-eye image to an observer's right eye during the first period, and a second voltage V1 is applied to deform the light-modulating medium therein for deflecting the left-eye image to the observer's left eye during the second period, respectively. A pulse voltage is applied to the light-modulating device 120 between the first period and the second period, thereby largely deforming the light-modulating medium in the light-modulating device 120. As shown in FIGS. 4A and 4B, the period before the time point t1 is the first period, and the period after the time point t1 is the second period. A dotted line shows the response of the light-modulating medium in the light-modulating device 120. As shown in FIG. 4A, no pulse voltage is applied at the time point t1, and the light-modulating medium slowly deforms due to the smooth response. As shown in FIG. 4B, a pulse voltage (V1+ΔV) is applied at the t1 for a period of Δt, such that the light-modulating medium quickly deforms due to the sharp response. In one embodiment, the ΔV is greater than 0 and depend upon on operation conditions in practice. As shown in FIGS. 4C and 4D, the period before the time point t1 is the first period, and the period after the time point t1 is the second period. As shown in FIG. 4C, no pulse voltage is applied at the time point t1, and the light-modulating medium may slowly deform. As shown in FIG. 4D, a pulse voltage (V0−ΔV) is applied at the t1 for a period of Δt, such that the light-modulating medium may quickly deform. In one embodiment, the ΔV is greater than 0 and depend upon on operation conditions in practice.

During the period of applying the pulse voltage to the light-modulating device, a black screen can be inserted between the first period of the right-eye image and the second period of the left-eye image in the display device. The images deflected by the light-modulating device during the first and second periods may confuse the observer, and the black screen may eliminate these undesired images. In one embodiment, the image display is a self-illumination device, and the black screen is inserted by switching off the self-illumination device. In other embodiment, the image display includes a backlight unit, and black screen is inserted by switching off the backlight unit.

Figure 5:
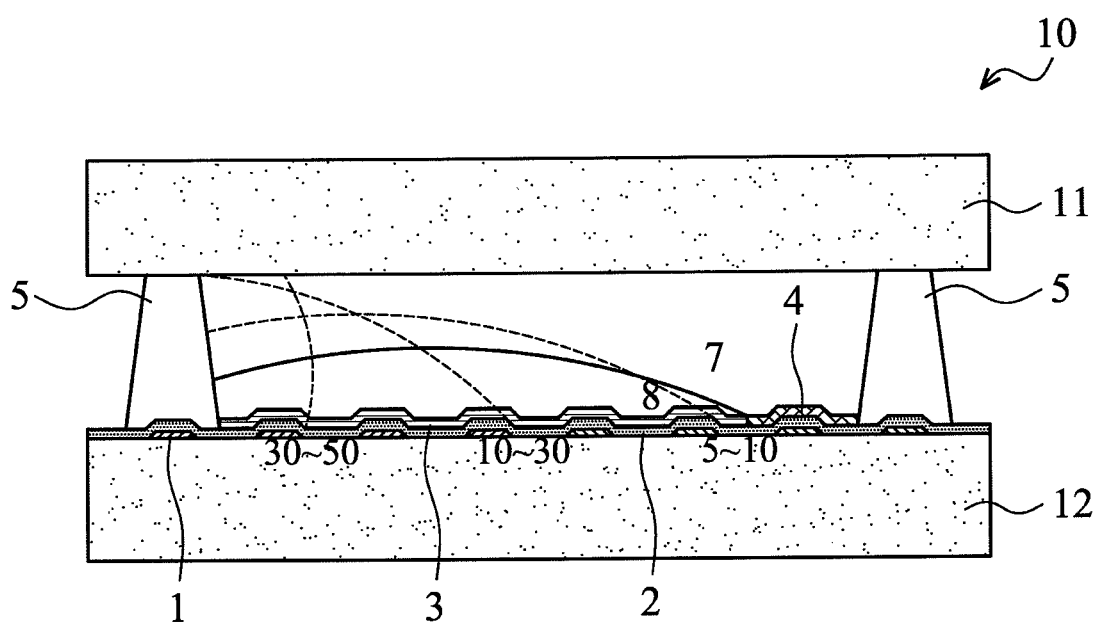
FIGS. 5, 6A-6C, 10A-10C, 11A-11D, 12A-12D, 13A-13D, 14A-14D, and 16A-16G show cross-sectional views of electrically switchable light-modulating cells in some embodiments of the disclosure.

In one embodiment, the light-modulating device 120 may include a plurality of electrically switchable light-modulating cells 10, as shown in FIG. 5. The electrically switchable light-modulating cell 10 includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. For example, the light-modulating medium can be an electro-conductive or polar liquid (e.g. water), and the light-modulating medium can be a non-polar liquid (e.g. oil).

Note that the definition of the terms "low-contact-angle material" and "high-contact-angle material" depend on the polarity of the light-modulating medium and the materials contacting the light-modulating medium. The contact angle is the angle at which a liquid/vapor interface meets a solid surface. Contact angle measurements can be used to determine the surface energy of a material. For example, the polar light-modulating medium forms droplets having a high contact angle (>90°) on a hydrophobic material surface, and thus the hydrophobic material is a high-contact-angle material for the polar light-modulating medium. Moreover, the non-polar light-modulating medium will form droplets having a low contact angle on the hydrophobic material surface and thus hydrophobic material is a low-contact-angle material for the non-polar light-modulating medium. The hydrophobic layer can be, but is not limited to, Teflon AF 1600 (commercially available from Dupont), CYTOP (commercially available from Asahi), PDMS, TEOS, epoxy, or the like. The hydrophilic layer can be, but is not limited to, acrylic acid, siloxane-containing material, and the like. The hydrophobic layer and the hydrophilic layer preferably have transparency, flexibility, and surface stability.

In FIG. 5, an electric potential difference generator such as discrete electrodes 1 is disposed on the bottom substrate 12. The discrete electrodes 1 provide a plurality of parallel potential lines distributed on the bottom substrate 12. A dielectric layer 2 is conformally formed on the discrete electrodes 1, and a hydrophilic layer 4 and a hydrophobic layer 3 are conformally formed on the dielectric layer 2, respectively. Therefore, part of the bottom substrate 12 with the hydrophilic layer 4 thereon is wettable by the light-modulating medium 7, and the other part of the bottom substrate 12 with the hydrophobic layer 3 thereon is wettable by the second light-modulating medium 8. While a voltage of 5V to 10V is applied to the discrete electrodes 1, the interface of the first and second light-modulating media 7 and 8 moves to align a first potential line on the right side of the bottom substrate 12. While a voltage of 10V to 30V is applied to the discrete electrodes 1, the interface of the first and second light-modulating media 7 and 8 moves to align a second potential line in the middle of the bottom substrate 12. While a voltage of 30V to 50V is applied to the discrete electrodes 1, the interface of the first and second light-modulating media 7 and 8 moves to align a third potential line on left side of the bottom substrate 12.

Figure 6A:
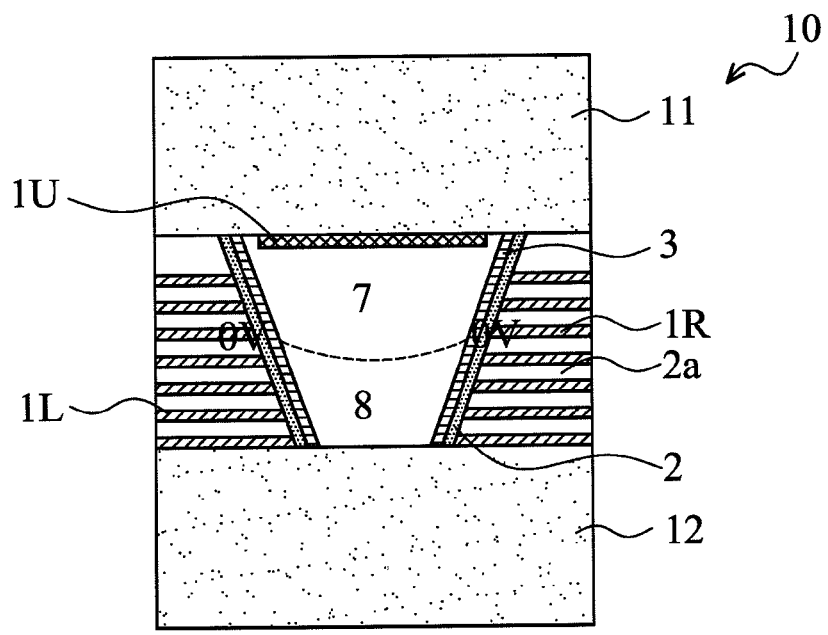
Figure 6B:
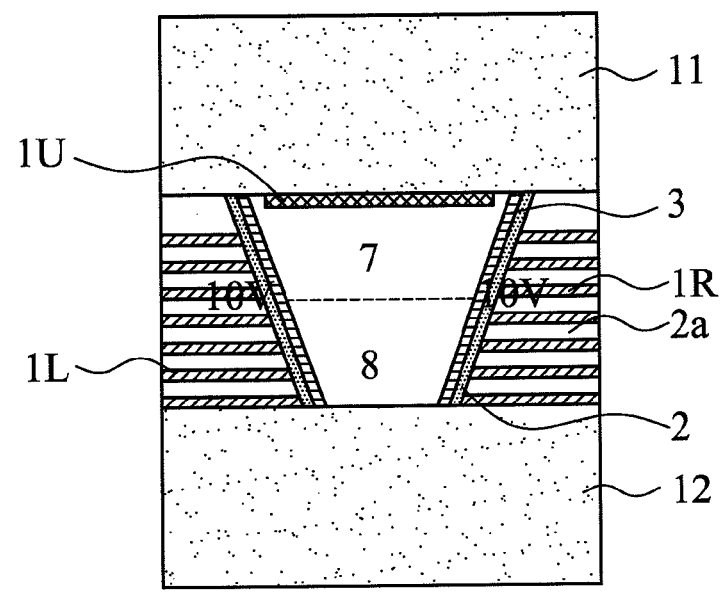
Figure 6C:
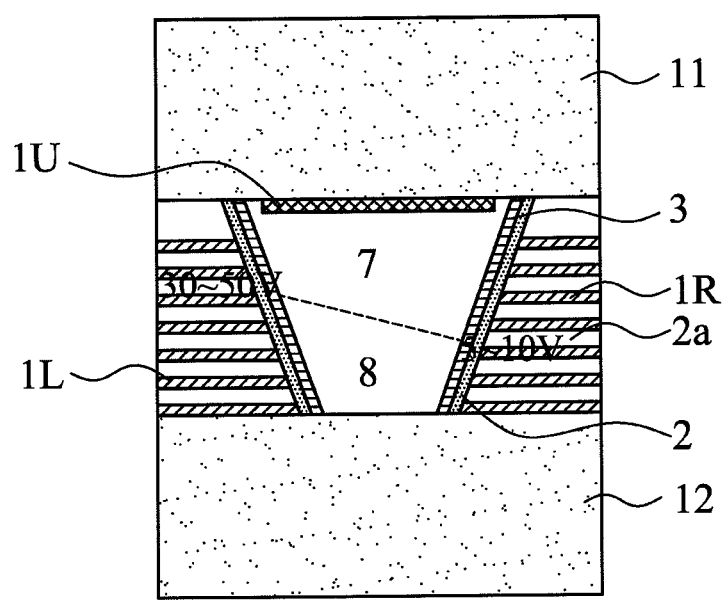
Figure 7A:
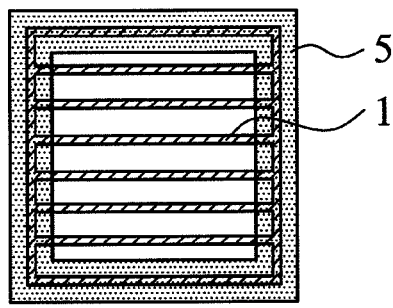
FIGS. 7A-7E, 8A-8E, 9A-9E, and 15A-15B show top-views of the arrangement of discrete electrodes in some embodiments of the disclosure.
Figure 7D:
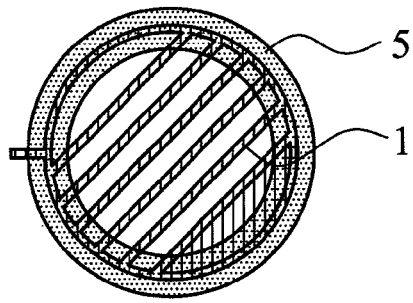
Figure 7B:
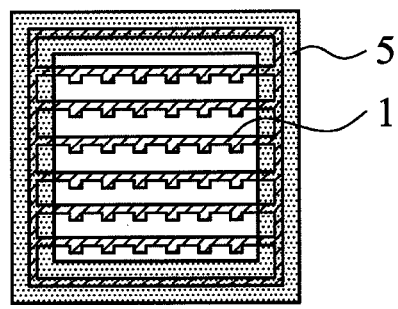
Figure 7E:
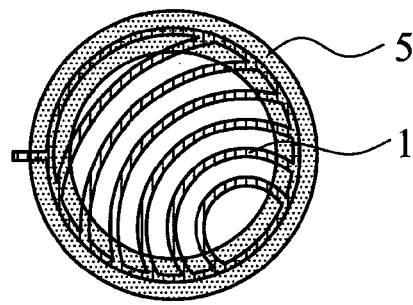
Figure 7C:
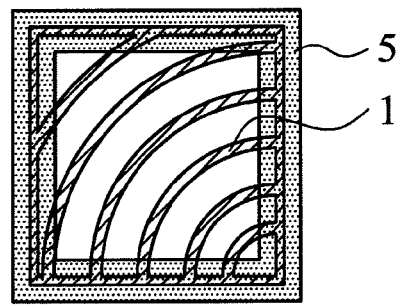
Figure 8A:
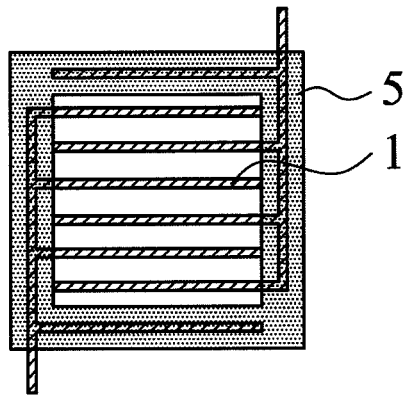
Figure 8B:
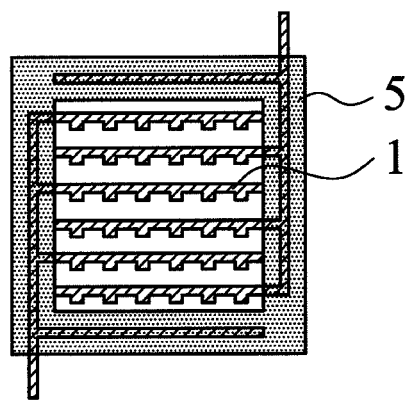
Figure 8C:
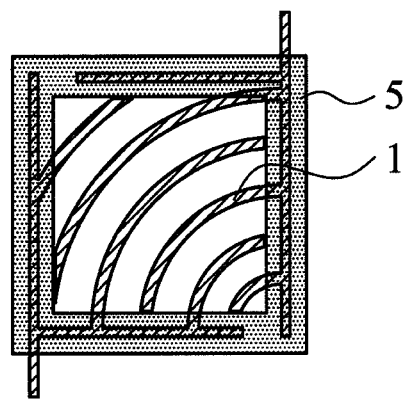
Figure 8D:
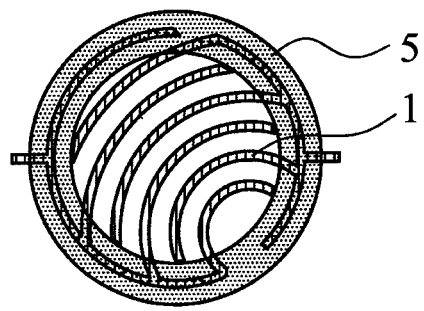
Figure 8E:
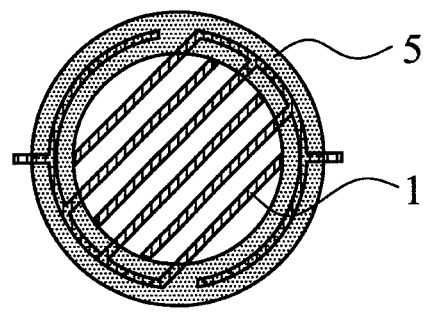
Figure 9A:
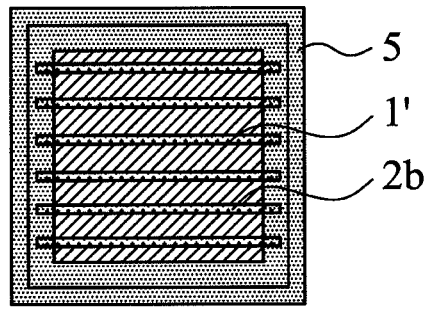
Figure 9B:
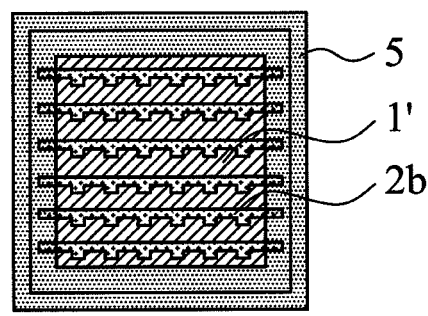
Figure 9C:
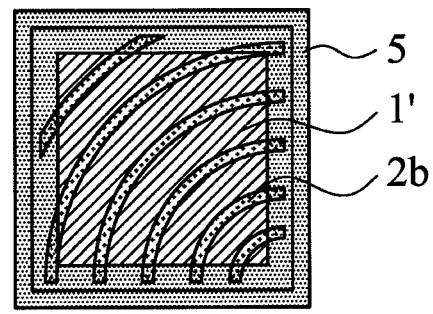
Figure 9D:
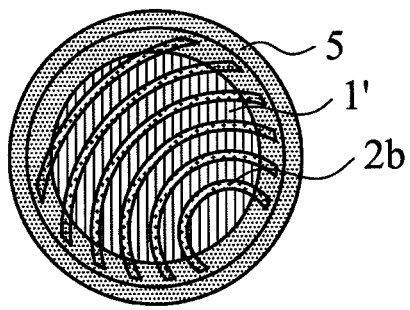
Figure 9E:
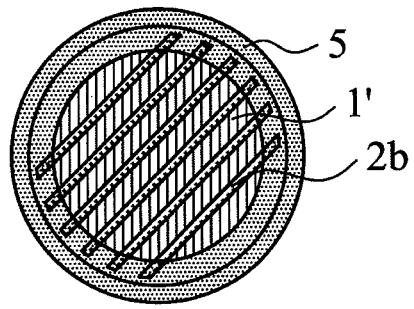

FIG. 6A shows another electrically switchable light-modulating cell 10, wherein the discrete electrodes are not disposed on the bottom substrate 12 as shown in FIG. 5. In FIG. 6A, the discrete electrodes 1R are disposed in the right partition wall 5, and the discrete electrodes 1L are disposed in the left partition wall 5, respectively. In FIG. 6A, the dielectric layers 2a and the discrete electrodes 1R and 1L are alternately stacked to compose the partition walls 5. A dielectric layer 2 is formed on the surface of the partition walls 5, and a hydrophobic layer 3 is formed on the dielectric layer 2. Furthermore, a top electrode 1U is formed on the top substrate 11. The combination of the discrete electrodes 1R and 1L and the dielectric layers 2a serve as an electric potential difference generator to provide a plurality of parallel potential lines distributed where the electric potential difference generator is located. The partition walls 5 with the hydrophobic layer 3 thereon are wettable by the second light-modulating medium 8. While no voltage is applied to the discrete electrodes 1R and 1L, the interface of the first and second light-modulating media 7 and 8 has a concave shape due to the capillary effect. While a specific voltage (e.g. 10V) is simultaneously applied to the discrete electrodes 1R and 1L, the interface of the first and second light-modulating media 7 and 8 has a flat shape, as shown in FIG. 6B. However, while a greater voltage (e.g. >10V) is simultaneously applied to the discrete electrodes 1R and 1L, the interface of the first and second light-modulating media 7 and 8 has a convex shape. While a voltage of 30 to 50V is applied to the discrete electrodes 1L, and a voltage of 5 to 10V is applied to the discrete electrodes 1R, the interface of the first and second light-modulating media 7 and 8 will tilt with a flat shape, as shown in FIG. 6C. Accordingly, the voltages applied to the discrete electrodes 1R and 1L may exactly control the shape and position of the interface of the first and second light-modulating media 7 and 8.

The discrete electrodes 1 disposed on the bottom substrate 12 can be electrically connected as shown in top views of FIGS. 7A, 7B, 7C, 7D, and 7E. Note that the discrete electrode pattern in FIGS. 7A, 7B, 7C, 7D, and 7E can be utilized in the discrete electrodes 1R and 1L in the partition walls 5. Alternatively, the discrete electrode pattern in FIGS. 7A, 7B, 7C, 7D, and 7E can be formed on the top substrate 11 as the top electrode 1U. In other words, the top electrode 1U can be discrete electrodes other than a sheet, thereby providing a plurality of parallel potential lines distributed on the top substrate 11.

In some embodiments, the discrete electrodes 1 can be separated to a first set of electrode lines and a second set of electrode lines, as shown in FIGS. 8A, 8B, 8C, 8D, and 8E. The first set of electrode lines are electrically connected to each other, the second set of electrode lines are electrically connected to each other, and the first set of electrode lines are not electrically connected to the second set of electrode lines. Note that the discrete electrode pattern in FIGS. 8A, 8B, 8C, 8D, and 8E can be utilized in the discrete electrodes 1R and 1L in the partition walls 5. Alternatively, the discrete electrode pattern in FIGS. 8A, 8B, 8C, 8D, and 8E can be formed on the top substrate 11 as the top electrode 1U. In other words, the top electrode 1U can be discrete electrodes other than a sheet, thereby providing a plurality of parallel potential lines distributed on the top substrate 11.

A voltage applied to the first set of electrode lines can be different from another voltage applied to the second set of the electrode lines. For example, the second set of the electrode lines can be electrically connected to ground. A DC signal, an AC signal, a multi-level signal, or a series connection pulsed signal is applied to the first set of electrode lines.

As shown in FIGS. 7A, 7B, 7C, 7D, 7E, 8A, 8B, 8C, 8D, and 8E, the electric potential difference generator (e.g. the discrete electrode 1) has a top view shape that may be a rectangular shape, a circular shape, a honeycomb shape, a polygonal shape, or another suitable shape.

The electric potential difference generator can be another element, such as discrete dielectric units 2b, other than the discrete electrodes 1. As shown in FIGS. 9A, 9B, 9C, 9D, and 9E, the electrode sheet 1' is formed on the bottom substrate 12, and the discrete dielectric units 2b are formed on the electrode sheet 1' to provide a plurality of parallel potential lines distributed on the bottom substrate 12. Similarly, the electrode sheet 1' can be formed on the partition walls and/or the top substrate 11, and the discrete dielectric units 2b can be formed on the electrode sheet 1' to provide a plurality of parallel potential lines distributed on the partition walls 5 and/or the top substrate 11.

As shown in FIGS. 9A, 9B, 9C, 9D, and 9E, the electric potential difference generator (e.g. the discrete dielectric units 2b) has a top view shape that may be a rectangular shape, a circular shape, a honeycomb shape, a polygonal shape, or another suitable shape.

Figure 10A:
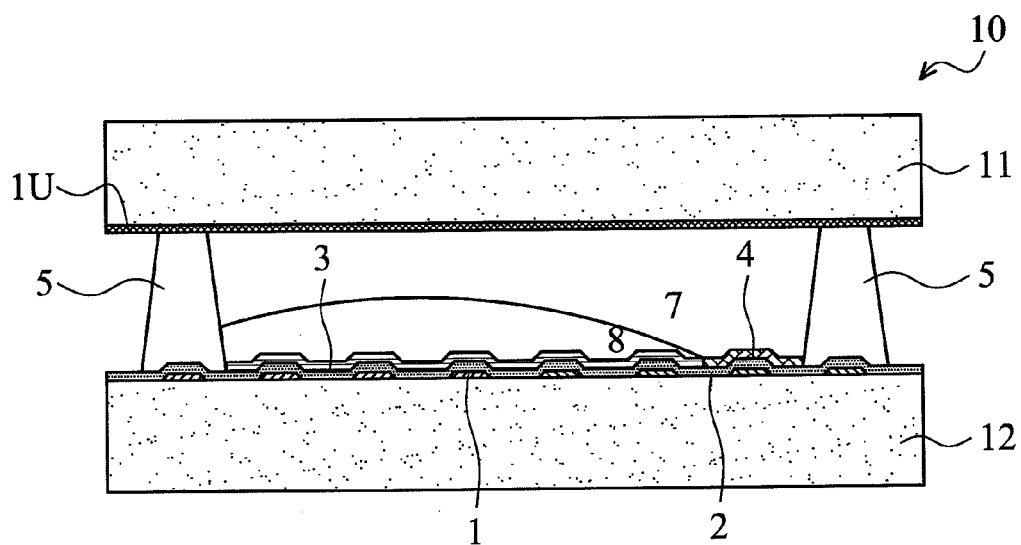

Similar to FIG. 5, the electrically switchable light-modulating cell 10 in FIG. 10A includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 10A, an electric potential difference generator such as discrete electrodes 1 is disposed on the bottom substrate 12. The discrete electrodes 1 provide a plurality of parallel potential lines distributed on the bottom substrate 12. A dielectric layer 2 is conformally formed on the discrete electrodes 1, and a hydrophilic layer 4 and a hydrophobic layer 3 are conformally formed on the dielectric layer 2, respectively. Therefore, part of the bottom substrate 12 with the hydrophilic layer 4 thereon is wettable by the light-modulating medium 7, and another part of the bottom substrate 12 with the hydrophobic layer 3 thereon is wettable by the second light-modulating medium 8, respectively. In addition, a top electrode 1U is formed on the top substrate 11. As described above, the top electrode 1U can be a sheet or discrete electrodes.

Figure 10B:
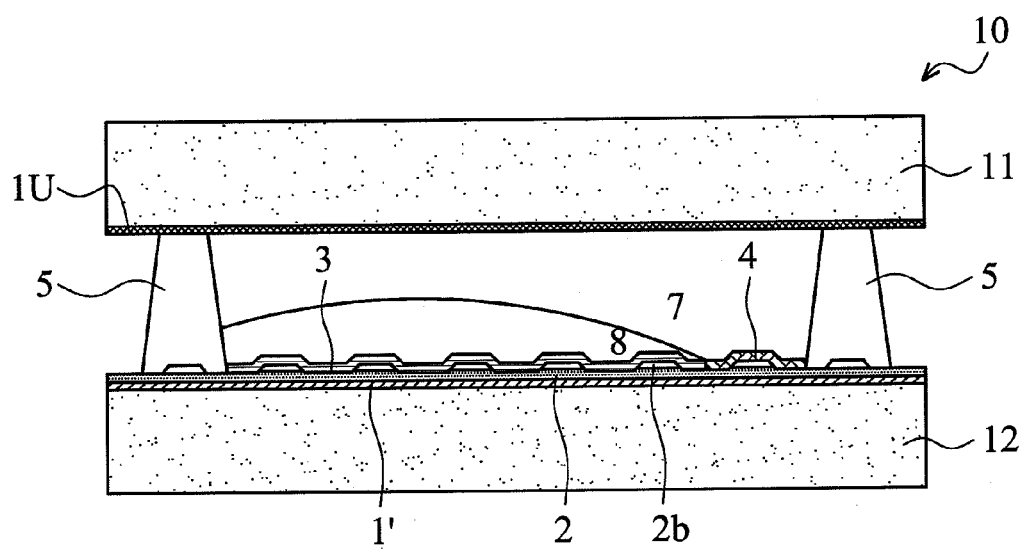

The electrically switchable light-modulating cell 10 in FIG. 10B includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 10B, the electrode sheet 1' is formed on the bottom substrate 12. A dielectric layer 2 is formed on the electrode sheet 1', and discrete dielectric units 2b are formed on the dielectric layer 2. The discrete dielectric units 2b provide a plurality of parallel potential lines distributed on the bottom substrate 12. A hydrophilic layer 4 and a hydrophobic layer 3 are conformally formed on the dielectric layer 2 and the discrete dielectric units 2b, respectively. Therefore, the part of the bottom substrate 12 with the hydrophilic layer 4 thereon is wettable by the light-modulating medium 7, and the other part of the bottom substrate 12 with the hydrophobic layer 3 thereon is wettable by the second light-modulating medium 8. In addition, a top electrode 1U is optionally formed on the top substrate 11. As described above, the top electrode 1U can be a sheet or discrete electrodes.

Figure 10C:
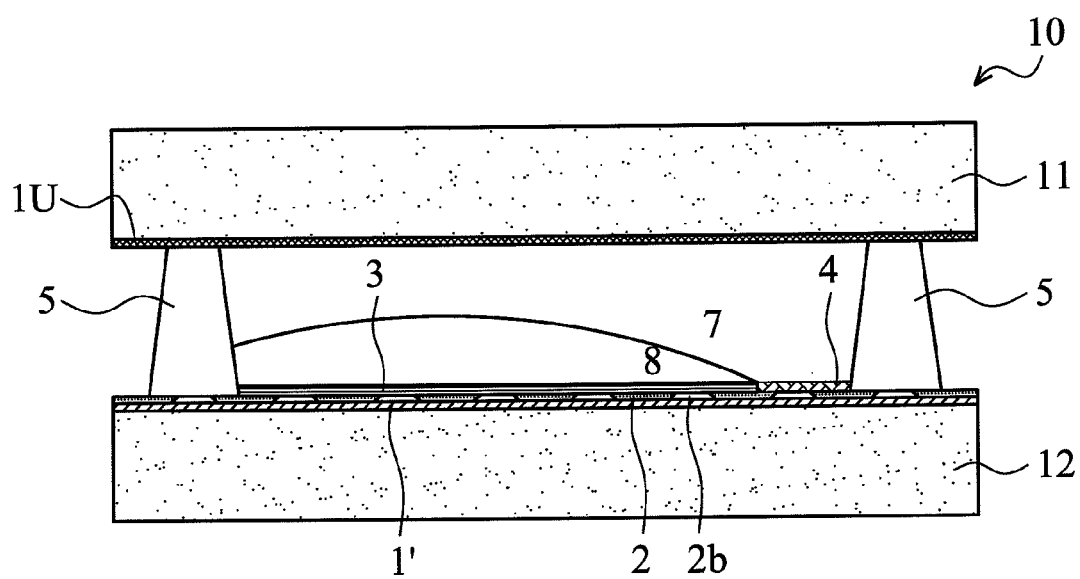

The electrically switchable light-modulating cell 10 in FIG. 10C includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 10C, the electrode sheet 1' is formed on the bottom substrate 12. Discrete dielectric units 2b and the dielectric layer 2 are interlaced with each other and formed on the electrode sheet 1'. The discrete dielectric units 2b and the dielectric layer 2 are composed of different dielectric materials having different dielectric constants. The combination of the discrete dielectric units 2b and the dielectric layer 2 provides a plurality of parallel potential lines distributed on the bottom substrate 12. The hydrophilic layer 4 and the hydrophobic layer 3 are formed on the dielectric layer 2 and the discrete dielectric units 2b, respectively. Therefore, part of the bottom substrate 12 with the hydrophilic layer 4 thereon is wettable by the light-modulating medium 7, and the other part of the bottom substrate 12 with the hydrophobic layer 3 thereon is wettable by the second light-modulating medium 8. In addition, a top electrode 1U is optionally formed on the top substrate 11. As described above, the top electrode 1U can be a sheet or discrete electrodes.

Figure 11A:
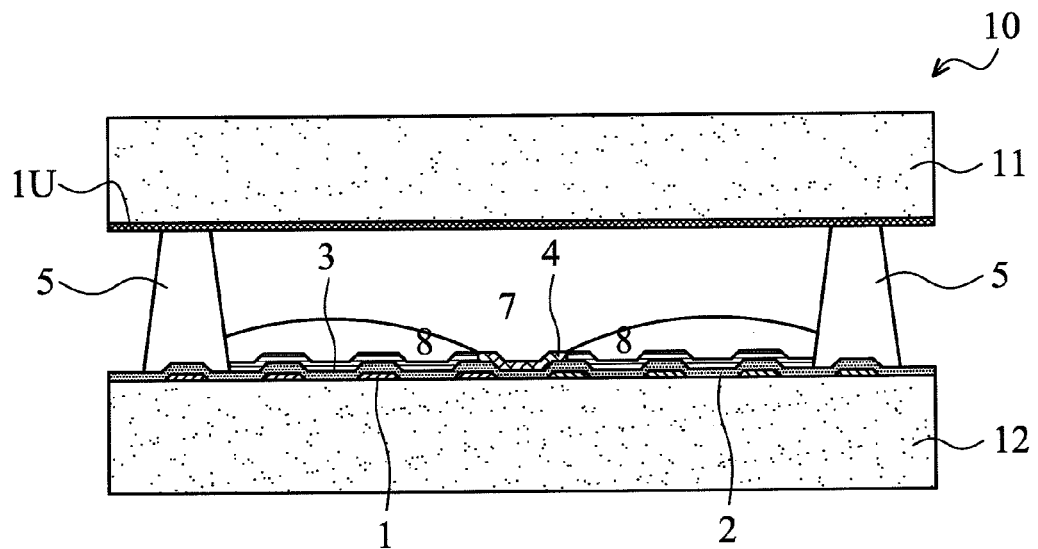
Figure 11B:
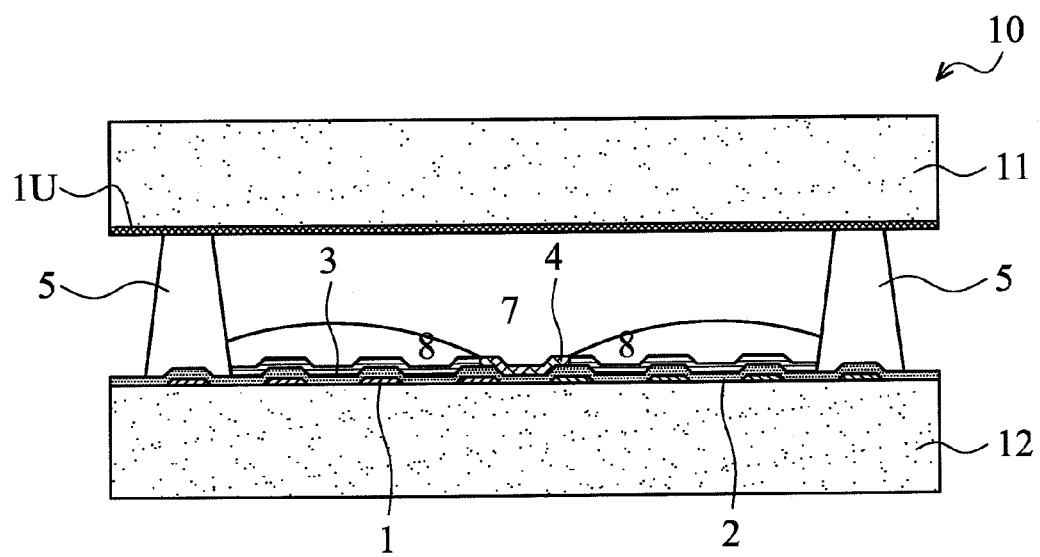

Similar to FIG. 5, the electrically switchable light-modulating cell 10 in FIG. 11A includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 11A, an electric potential difference generator such as discrete electrodes 1 is disposed on the bottom substrate 12. The discrete electrodes 1 provide a plurality of parallel potential lines distributed on the bottom substrate 12. A dielectric layer 2 is conformally formed on the discrete electrodes 1, and a hydrophilic layer 4 and a hydrophobic layer 3 are conformally formed on the dielectric layer 2. Therefore, part of the bottom substrate 12 with the hydrophilic layer 4 thereon is wettable by the light-modulating medium 7, and the other part of the bottom substrate 12 with the hydrophobic layer 3 thereon is wettable by the second light-modulating medium 8. In FIG. 11A, the hydrophobic layer 3 is divided into two separate parts by the hydrophilic layer 4 disposed on the middle part of the bottom substrate 12. Therefore, the second light-modulating medium 8 will be divided into two parts. In addition, a top electrode 1U can be further formed on the top substrate 11, as shown in FIG. 11B. As described above, the top electrode 1U can be a sheet or discrete electrodes.

Figure 11C:
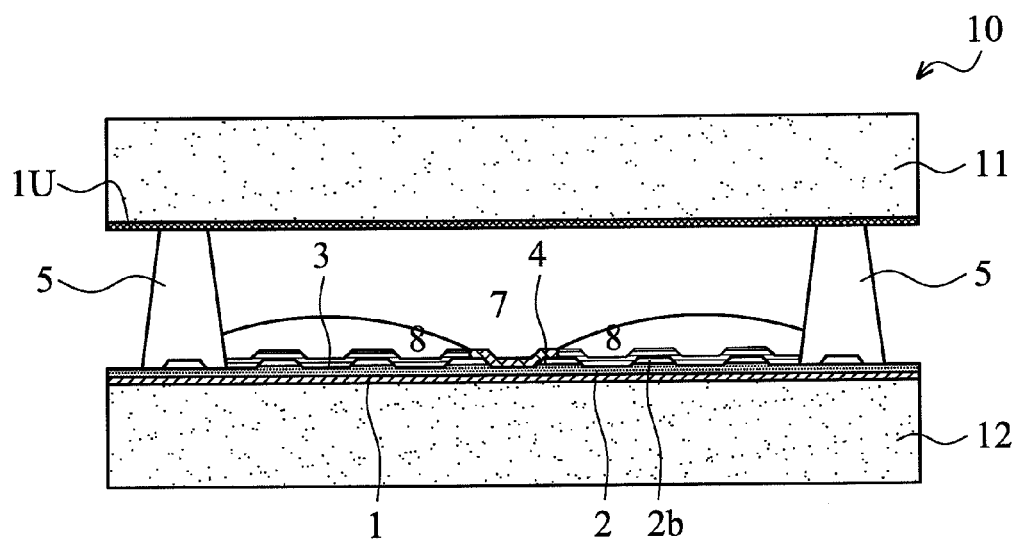

Similar to FIG. 10B, the electrically switchable light-modulating cell 10 in FIG. 11C includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 11C, the electrode sheet 1' is formed on the bottom substrate 12. A dielectric layer 2 is formed on the electrode sheet 1', and discrete dielectric units 2b are formed on the dielectric layer 2. The discrete dielectric units 2b provide a plurality of parallel potential lines distributed on the bottom substrate 12. A hydrophilic layer 4 and a hydrophobic layer 3 are conformally formed on the dielectric layer 2 and the discrete dielectric units 2b, respectively. Therefore, part of the bottom substrate 12 with the hydrophilic layer 4 thereon is wettable by the light-modulating medium 7, and the other part of the bottom substrate 12 with the hydrophobic layer 3 thereon is wettable by the second light-modulating medium 8. In FIG. 11C, the hydrophobic layer 3 is divided into two separate parts by the hydrophilic layer 4 disposed on the middle part of the bottom substrate 12. Therefore, the second light-modulating medium 8 will be divided into two parts. In addition, a top electrode 1U is optionally formed on the top substrate 11. As described above, the top electrode 1U can be a sheet or discrete electrodes.

Figure 11D:
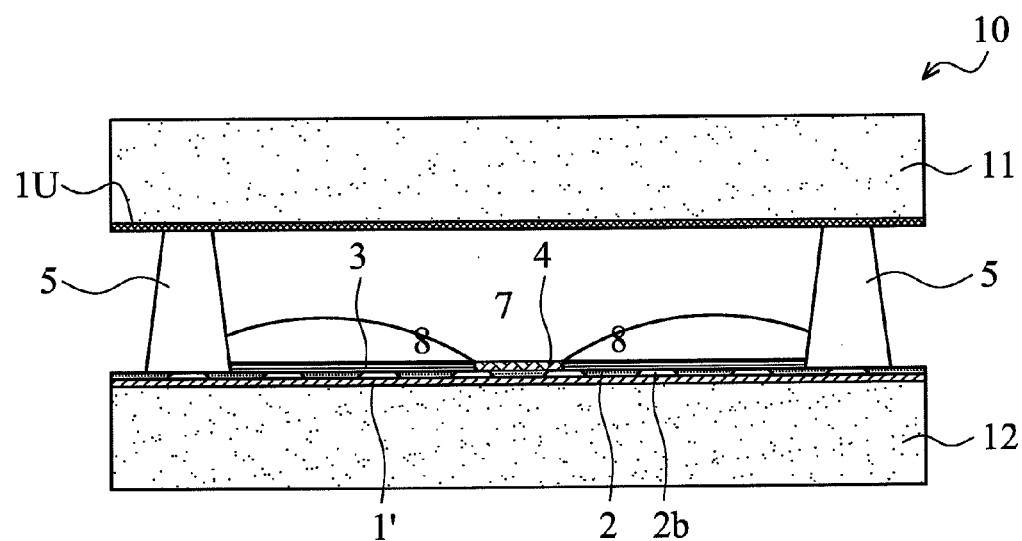

Similar to FIG. 10C, the electrically switchable light-modulating cell 10 in FIG. 11D includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 11D, the electrode sheet 1' is formed on the bottom substrate 12. Discrete dielectric units 2b and the dielectric layer 2 are interlaced with each other and formed on the electrode sheet 1'. The discrete dielectric units 2b and the dielectric layer 2 are composed of different dielectric materials having different dielectric constants. The combination of the discrete dielectric units 2b and the dielectric layer 2 provides a plurality of parallel potential lines distributed on the bottom substrate 12. A hydrophilic layer 4 and a hydrophobic layer 3 are formed on the dielectric layer 2 and the discrete dielectric units 2b, respectively. Therefore, part of the bottom substrate 12 with the hydrophilic layer 4 thereon is wettable by the light-modulating medium 7, and the other part of the bottom substrate 12 with the hydrophobic layer 3 thereon is wettable by the second light-modulating medium 8. In FIG. 11D, the hydrophobic layer 3 is divided into two separate parts by the hydrophilic layer 4 disposed on the middle part of the bottom substrate 12. Therefore, the second light-modulating medium 8 will be divided into two parts. In addition, a top electrode 1U is optionally formed on the top substrate 11. As described above, the top electrode 1U can be a sheet or discrete electrodes.

Figure 12A:
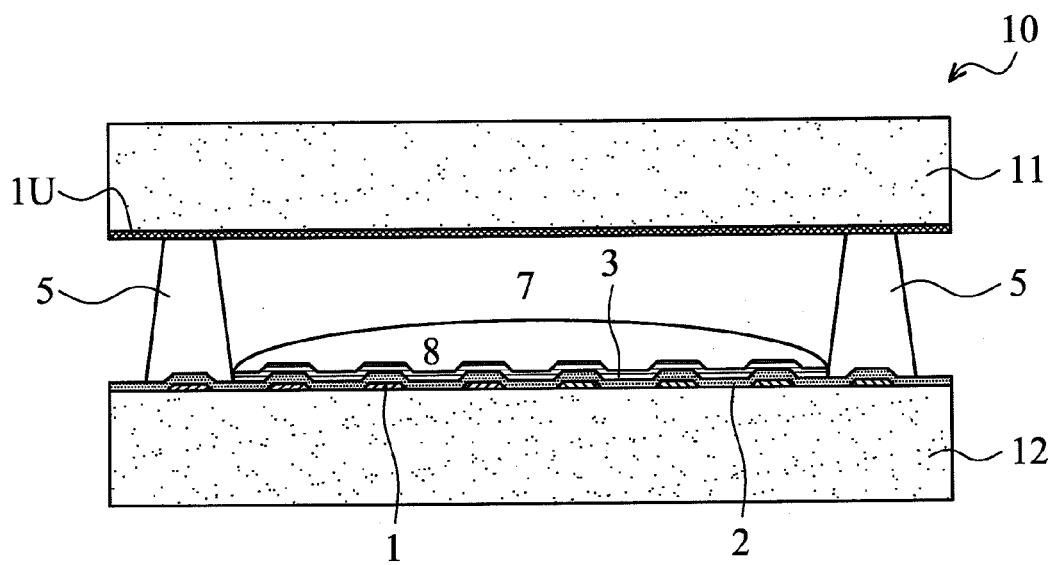
Figure 12B:
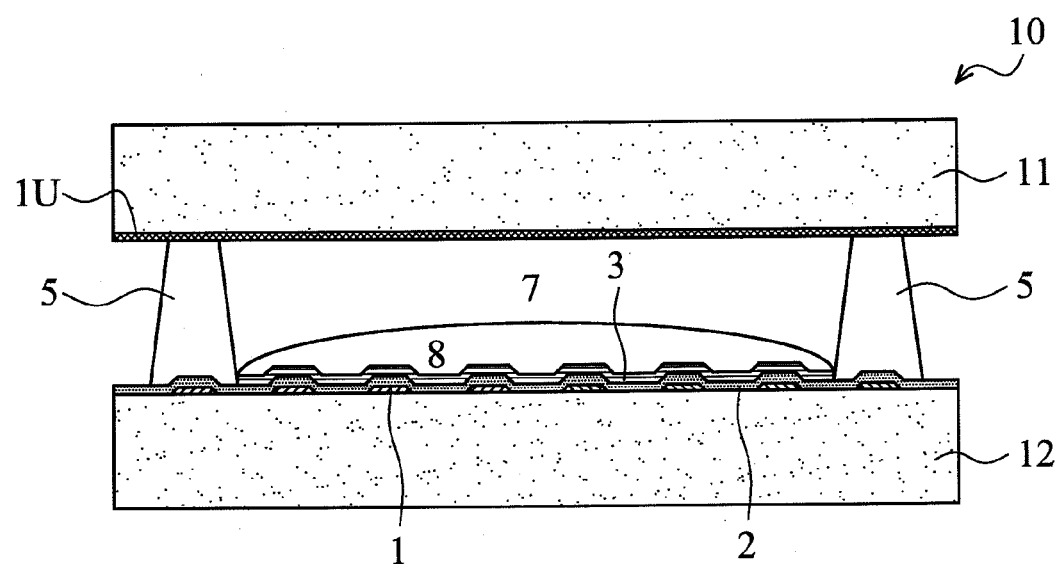

In FIG. 12A, the electrically switchable light-modulating cell 10 includes a bottom substrate 12, a partition wall 5 disposed on the bottom substrate 12, and a top substrate 11 disposed on the partition wall 5 and opposite to the bottom substrate 12. The partition wall 5 has a hydrophilic surface. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 12A, an electric potential difference generator such as discrete electrodes 1 is disposed on the bottom substrate 12. The discrete electrodes 1 provide a plurality of parallel potential lines distributed on the bottom substrate 12. A dielectric layer 2 is conformally formed on the discrete electrodes 1, and a hydrophobic layer 3 is conformally formed on the dielectric layer 2. Therefore, the bottom substrate 12 with the hydrophobic layer 3 thereon is wettable by the second light-modulating medium 8, and the partition walls 5 with the hydrophilic surface is wettable by the first light-modulating medium 7. In addition, a top electrode 1U can be formed on the top substrate 11, as shown in FIG. 12B. As described above, the top electrode 1U can be a sheet or discrete electrodes.

Figure 12C:
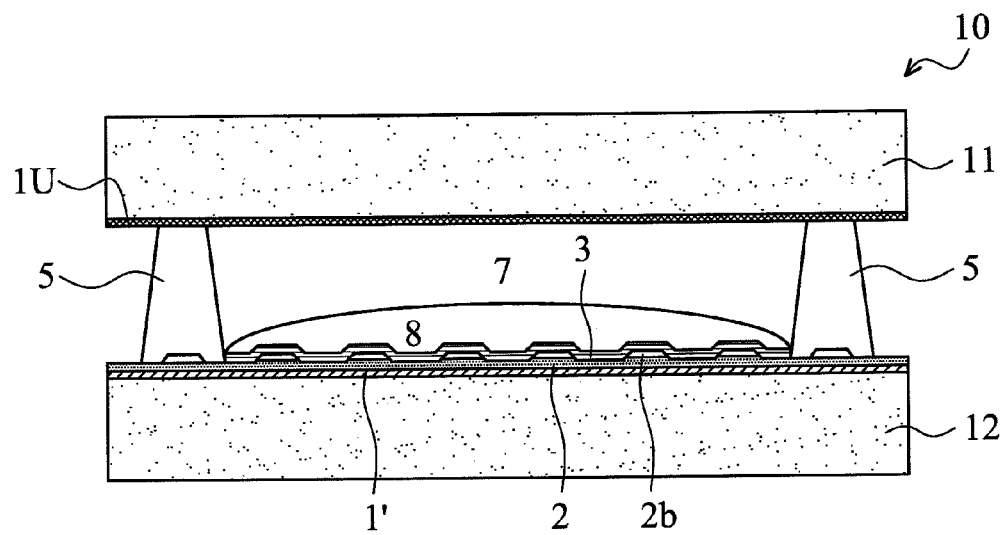

In FIG. 12C, the electrically switchable light-modulating cell 10 includes a bottom substrate 12, a partition wall 5 disposed on the bottom substrate 12, and a top substrate 11 disposed on the partition wall 5 and opposite to the bottom substrate 12. The partition wall 5 has a hydrophilic surface. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 12C, the electrode sheet 1' is formed on the bottom substrate 12. A dielectric layer 2 is formed on the electrode sheet 1', and discrete dielectric units 2b are formed on the dielectric layer 2. The discrete dielectric units 2b provide a plurality of parallel potential lines distributed on the bottom substrate 12. A hydrophobic layer 3 is conformally formed on the dielectric layer 2 and the discrete dielectric units 2b. Therefore, the bottom substrate 12 with the hydrophobic layer 3 thereon is wettable by the second light-modulating medium 8, and the partition walls 5 with the hydrophilic surface is wettable by the first light-modulating medium 7. In addition, a top electrode 1U is optionally formed on the top substrate 11. As described above, the top electrode 1U can be a sheet or discrete electrodes.

Figure 12D:
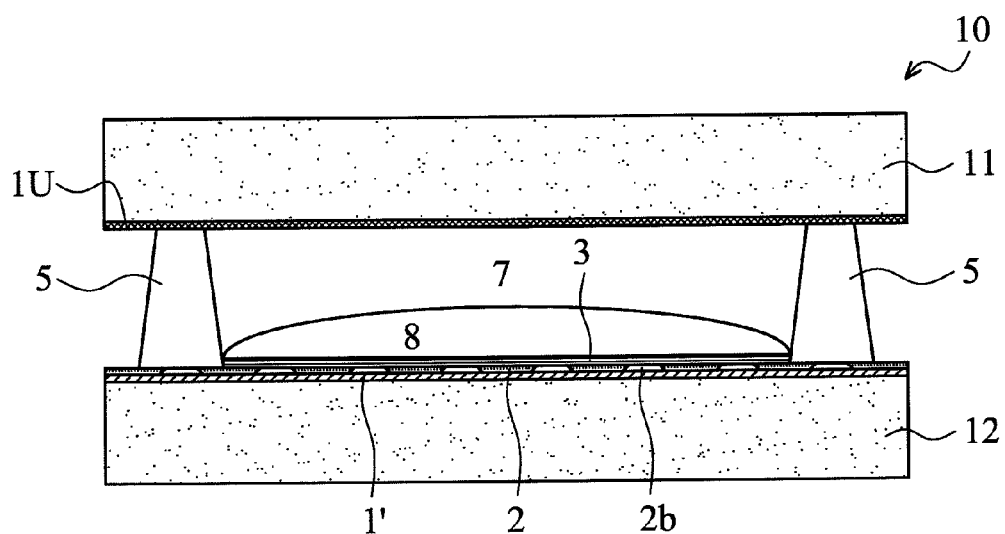

In FIG. 12D, the electrically switchable light-modulating cell 10 includes a bottom substrate 12, a partition wall 5 disposed on the bottom substrate 12, and a top substrate 11 disposed on the partition wall 5 and opposite to the bottom substrate 12. The partition wall 5 has a hydrophilic surface. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 12D, the electrode sheet 1' is formed on the bottom substrate 12. Discrete dielectric units 2b and the dielectric layer 2 are interlaced with each other and formed on the electrode sheet 1'. The discrete dielectric units 2b and the dielectric layer 2 are composed of different dielectric materials having different dielectric constants. The combination of the discrete dielectric units 2b and the dielectric layer 2 provides a plurality of parallel potential lines distributed on the bottom substrate 12. A hydrophobic layer 3 is formed on the dielectric layer 2 and the discrete dielectric units 2b. Therefore, the bottom substrate 12 with the hydrophobic layer 3 thereon is wettable by the second light-modulating medium 8, and the partition walls 5 with the hydrophilic surface is wettable by the first light-modulating medium 7. In addition, a top electrode 1U is optionally formed on the top substrate 11. As described above, the top electrode 1U can be a sheet or discrete electrodes.

Figure 13A:
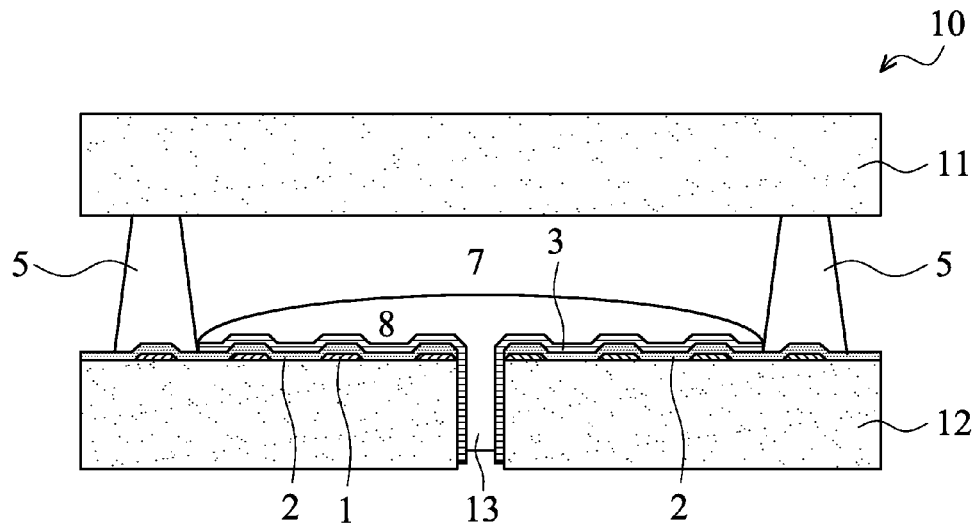
Figure 13B:
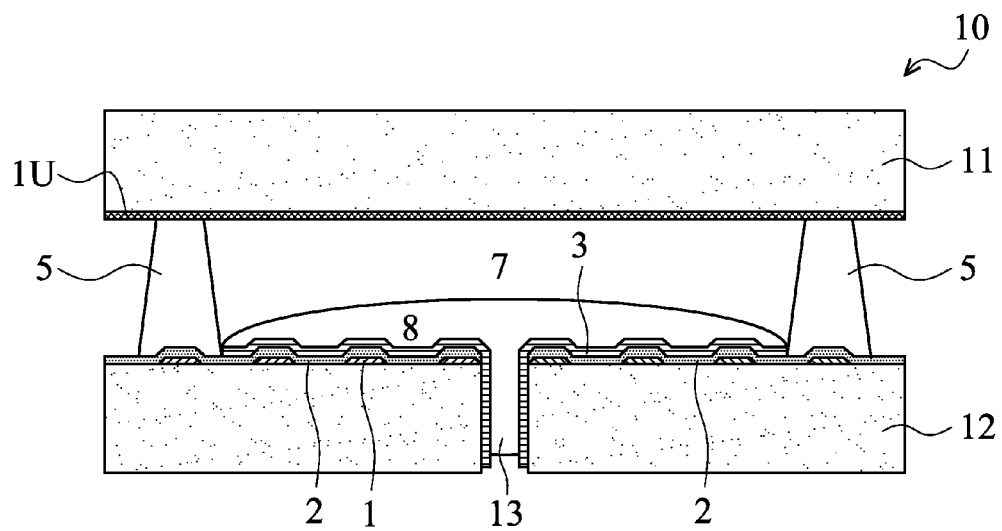

In FIG. 13A, the electrically switchable light-modulating cell 10 includes a bottom substrate 12, a partition wall 5 disposed on the bottom substrate 12, and a top substrate 11 disposed on the partition wall 5 and opposite to the bottom substrate 12. The partition wall 5 has a hydrophilic surface. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. The bottom substrate 12 includes a via 13 connecting to a storage pool (not shown) to contain the first light-modulating medium 7, and the via 13 is disposed in the center part of the bottom substrate 12. In FIG. 13A, an electric potential difference generator such as discrete electrodes 1 is disposed on the bottom substrate 12. The discrete electrodes 1 provide a plurality of parallel potential lines distributed on the bottom substrate 12. A dielectric layer 2 is conformally formed on the discrete electrodes 1, and a hydrophobic layer 3 is conformally formed on the dielectric layer 2 and sidewalls of the via 13. Therefore, the bottom substrate 12 with the hydrophobic layer 3 thereon is wettable by the second light-modulating medium 8, and the partition walls 5 with the hydrophilic surface is wettable by the first light-modulating medium 7. In addition, a top electrode 1U can be formed on the top substrate 11, as shown in FIG. 13B. As described above, the top electrode 1U can be a sheet or discrete electrodes.

Figure 13C:
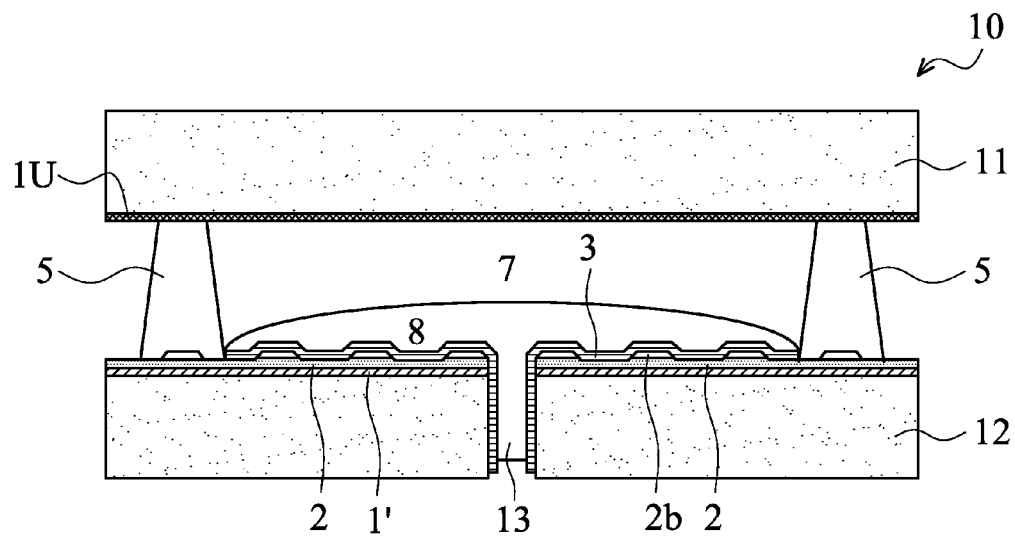

In FIG. 13C, the electrically switchable light-modulating cell 10 includes a bottom substrate 12, a partition wall 5 disposed on the bottom substrate 12, and a top substrate 11 disposed on the partition wall 5 and opposite to the bottom substrate 12. The partition wall 5 has a hydrophilic surface. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. The bottom substrate 12 includes a via 13 connecting to a storage pool (not shown) to contain the first light-modulating medium 7, and the via 13 is disposed in the center part of the bottom substrate 12. In FIG. 13C, the electrode sheet 1' is formed on the bottom substrate 12. A dielectric layer 2 is formed on the electrode sheet 1', and discrete dielectric units 2b are formed on the dielectric layer 2. The discrete dielectric units 2b provide a plurality of parallel potential lines distributed on the bottom substrate 12. A hydrophobic layer 3 is conformally formed on the dielectric layer 2, the discrete dielectric units 2b, and sidewalls of the via 13. Therefore, the bottom substrate 12 with the hydrophobic layer 3 thereon is wettable by the second light-modulating medium 8, and the partition walls 5 with the hydrophilic surface is wettable by the first light-modulating medium 7. In addition, a top electrode 1U is optionally formed on the top substrate 11. As described above, the top electrode 1U can be a sheet or discrete electrodes.

Figure 13D:
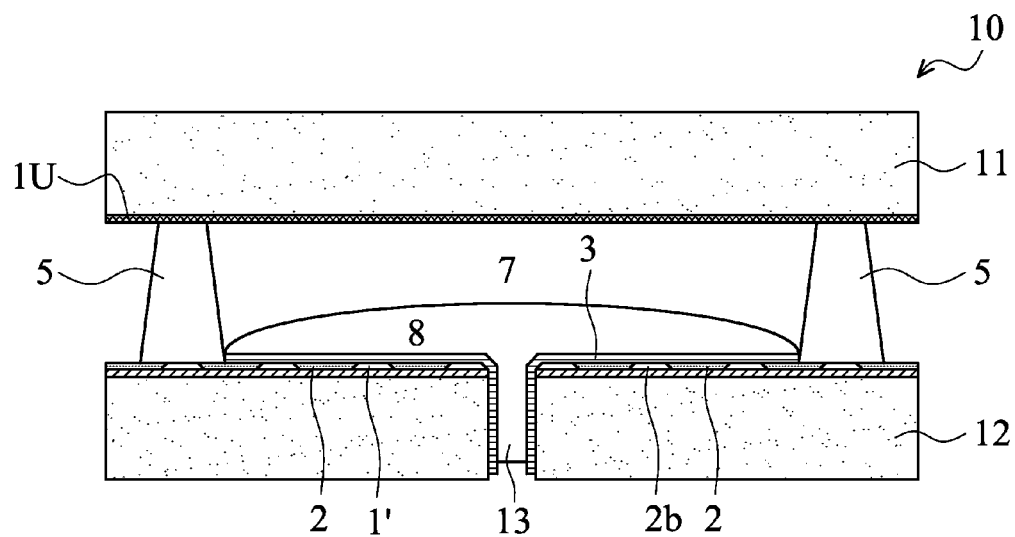

In FIG. 13D, the electrically switchable light-modulating cell 10 includes a bottom substrate 12, a partition wall 5 disposed on the bottom substrate 12, and a top substrate 11 disposed on the partition wall 5 and opposite to the bottom substrate 12. The partition wall 5 has a hydrophilic surface. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. The bottom substrate 12 includes a via 13 connecting to a storage pool (not shown) to contain the first light-modulating medium 7, and the via 13 is disposed in a center part of the bottom substrate 12. In FIG. 13D, the electrode sheet 1' is formed on the bottom substrate 12. Discrete dielectric units 2b and the dielectric layer 2 are interlaced with each other and formed on the electrode sheet 1'. The discrete dielectric units 2b and the dielectric layer 2 are composed of different dielectric materials having different dielectric constants. The combination of the discrete dielectric units 2b and the dielectric layer 2 provides a plurality of parallel potential lines distributed on the bottom substrate 12. A hydrophobic layer 3 is formed on the dielectric layer 2, the discrete dielectric units 2b, and sidewalls of the via 13. Therefore, the bottom substrate 12 with the hydrophobic layer 3 thereon is wettable by the second light-modulating medium 8, and the partition walls 5 with the hydrophilic surface is wettable by the first light-modulating medium 7. In addition, a top electrode 1U is optionally formed on the top substrate 11. As described above, the top electrode 1U can be a sheet or discrete electrodes.

Figure 14A:
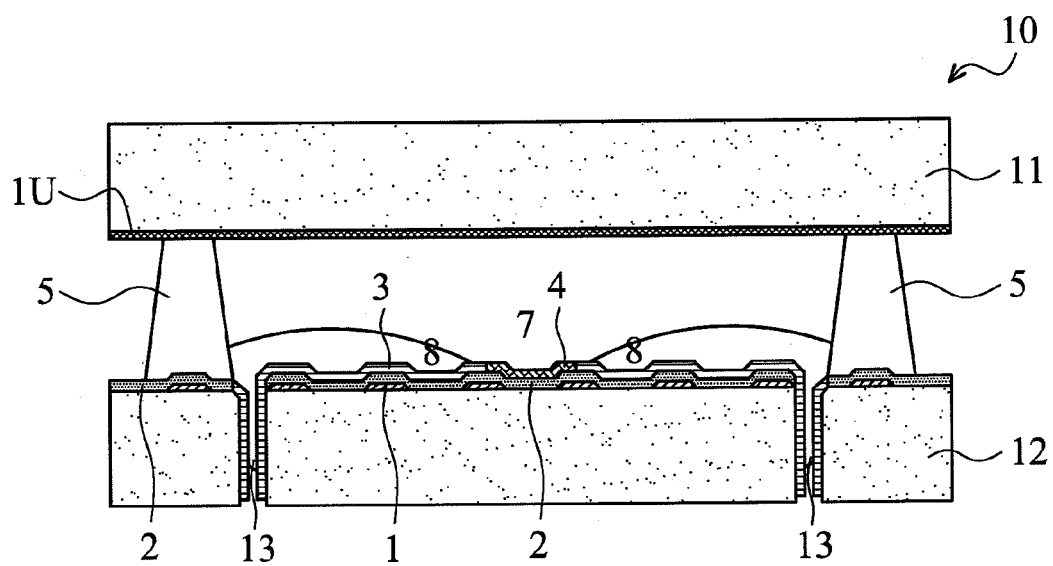
Figure 14B:
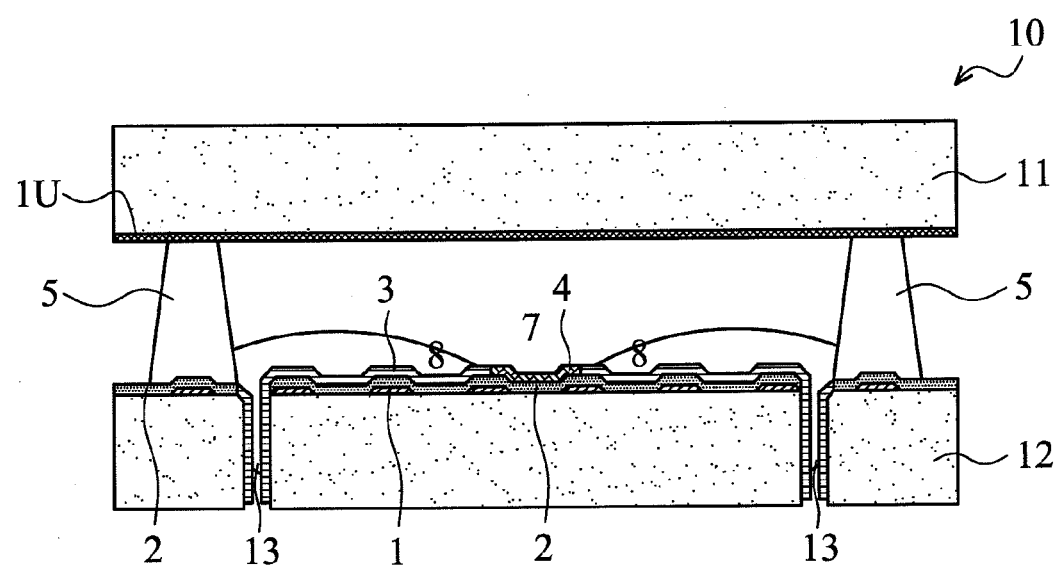

In FIG. 14A, the electrically switchable light-modulating cell 10 includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. The bottom substrate 12 includes at least one via 13 connecting to a storage pool (not shown) to contain the first light-modulating medium 7, and the via 13 is disposed in a part of the bottom substrate 12 near the partition walls 5. In FIG. 14A, an electric potential difference generator such as discrete electrodes 1 is disposed on the bottom substrate 12. The discrete electrodes 1 provide a plurality of parallel potential lines distributed on the bottom substrate 12. A dielectric layer 2 is conformally formed on the discrete electrodes 1. A hydrophilic layer 4 and a hydrophobic layer 3 are conformally formed on the dielectric layer 2 and sidewalls of the via 13, respectively. Therefore, part of the bottom substrate 12 with the hydrophilic layer 4 thereon is wettable by the light-modulating medium 7, and the other part of the bottom substrate 12 with the hydrophobic layer 3 thereon is wettable by the second light-modulating medium 8. In FIG. 14A, the hydrophobic layer 3 is divided into two separate parts by the hydrophilic layer 4 disposed on the middle part of the bottom substrate 12. Therefore, the second light-modulating medium 8 will be divided into two parts. In addition, a top electrode 1U can be further formed on the top substrate 11, as shown in FIG. 14B. As described above, the top electrode 1U can be a sheet or discrete electrodes.

Figure 14C:
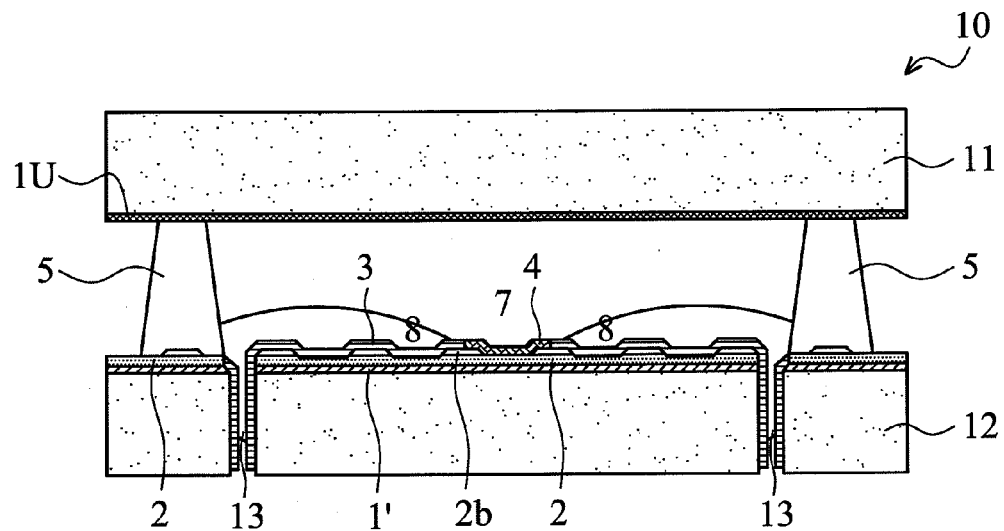

In FIG. 14C, the electrically switchable light-modulating cell 10 includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. The bottom substrate 12 includes at least one via 13 connecting to a storage pool (not shown) to contain the first light-modulating medium 7, and the via 13 is disposed in a part of the bottom substrate 12 near the partition walls 5. In FIG. 14C, the electrode sheet 1' is formed on the bottom substrate 12. A dielectric layer 2 is formed on the electrode sheet 1', and discrete dielectric units 2b are formed on the dielectric layer 2. The discrete dielectric units 2b provide a plurality of parallel potential lines distributed on the bottom substrate 12. A hydrophilic layer 4 and a hydrophobic layer 3 are conformally formed on the dielectric layer 2, the discrete dielectric units 2b, and sidewalls of the via 13, respectively. Therefore, part of the bottom substrate 12 with the hydrophilic layer 4 thereon is wettable by the light-modulating medium 7, and another part of the bottom substrate 12 with the hydrophobic layer 3 thereon is wettable by the second light-modulating medium 8, respectively. In FIG. 14C, the hydrophobic layer 3 is divided into two separate parts by the hydrophilic layer 4 disposed on the middle part of the bottom substrate 12. Therefore, the second light-modulating medium 8 will be divided into two parts. In addition, a top electrode 1U is optionally formed on the top substrate 11. As described above, the top electrode 1U can be a sheet or discrete electrodes.

Figure 14D:
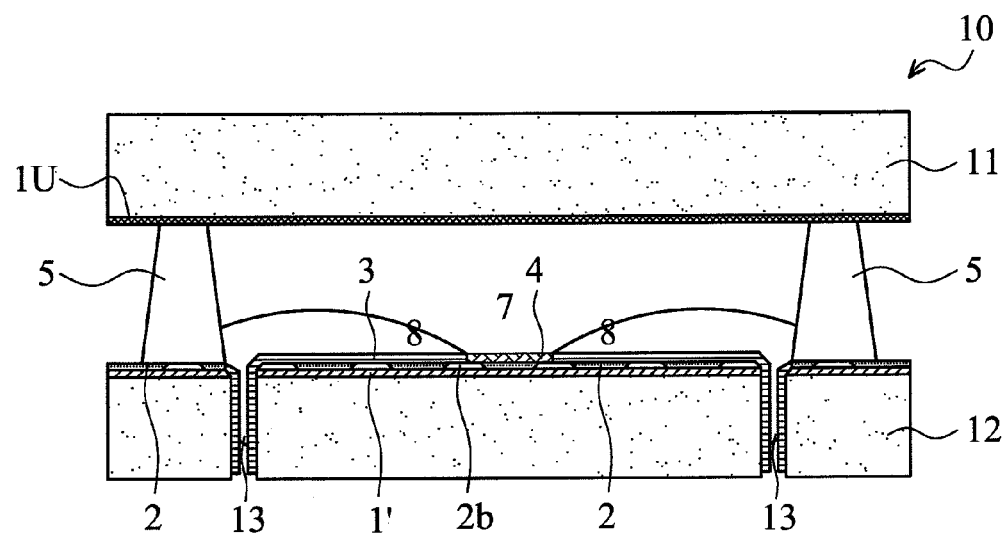

In FIG. 14D, the electrically switchable light-modulating cell 10 includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. The bottom substrate 12 includes at least one via 13 connecting to a storage pool (not shown) to contain the first light-modulating medium 7, and the via 13 is disposed in a part of the bottom substrate 12 near the partition walls 5. In FIG. 14D, the electrode sheet 1' is formed on the bottom substrate 12. Discrete dielectric units 2b and the dielectric layer 2 are interlaced with each other and formed on the electrode sheet 1'. The discrete dielectric units 2b and the dielectric layer 2 are composed of different dielectric materials having different dielectric constants. The combination of the discrete dielectric units 2b and the dielectric layer 2 provides a plurality of parallel potential lines distributed on the bottom substrate 12. A hydrophilic layer 4 and a hydrophobic layer 3 are formed on the dielectric layer 2, the discrete dielectric units 2b, and sidewalls of the via 13, respectively. Therefore, part of the bottom substrate 12 with the hydrophilic layer 4 thereon is wettable by the light-modulating medium 7, and the other part of the bottom substrate 12 with the hydrophobic layer 3 thereon is wettable by the second light-modulating medium 8. In FIG. 14D, the hydrophobic layer 3 is divided into two separate parts by the hydrophilic layer 4 disposed on the middle part of the bottom substrate 12. Therefore, the second light-modulating medium 8 will be divided into two parts. In addition, a top electrode 1U is optionally formed on the top substrate 11. As described above, the top electrode 1U can be a sheet or discrete electrodes.

In the above description, the electric potential difference generator such as the discrete electrodes, the discrete dielectric units, the combination of the discrete dielectric units and the dielectric layer interlaced with each other, and/or the combination of the hydrophilic layer and the hydrophobic layer, is disposed on the bottom substrate and/or the top substrate. However, the electric potential difference generator can be formed on partition walls. In other words, the electric potential difference generator can be formed on the top substrate, the bottom substrate, and/or the partition wall. One of the first and second light-modulating media can be driven by an electric potential difference from the electric potential difference generator.

Figure 15A:
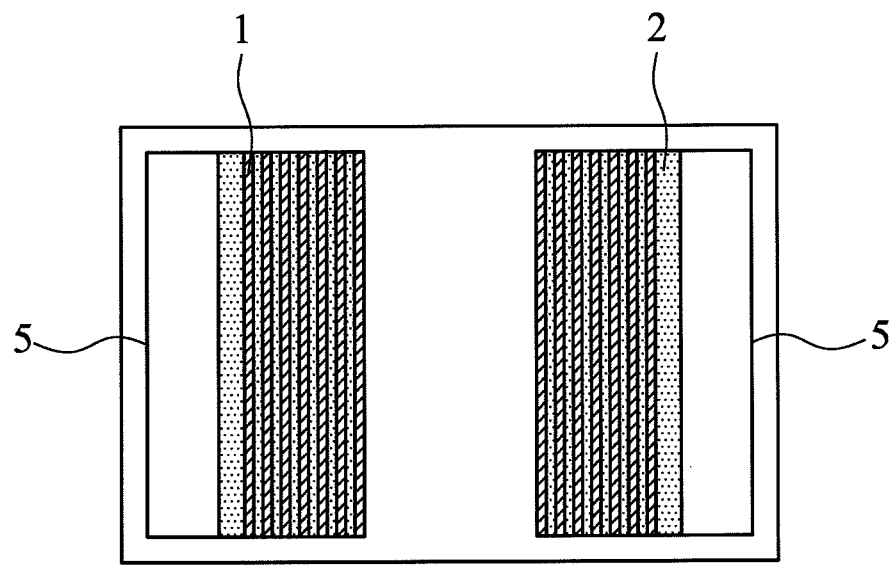
Figure 15B:
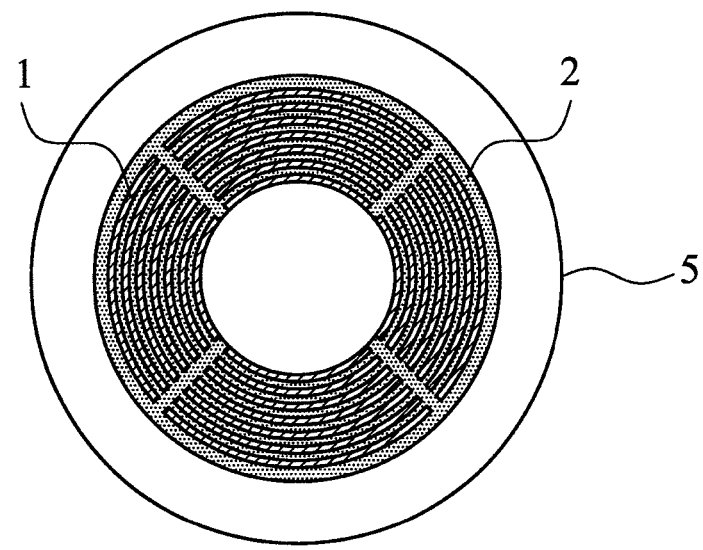

FIGS. 15A and 15B show top views of a compartment defined by a top substrate, a bottom substrate, and partition walls 5 of an electronically switchable light-modulating cell in some embodiment of the disclosure. The compartment may have a top view that is a rectangular shape as in FIG. 15A, a circular shape as in FIG. 15B, or another suitable shape such as a honeycomb shape, a polygonal shape, and the like.

Figure 16A:
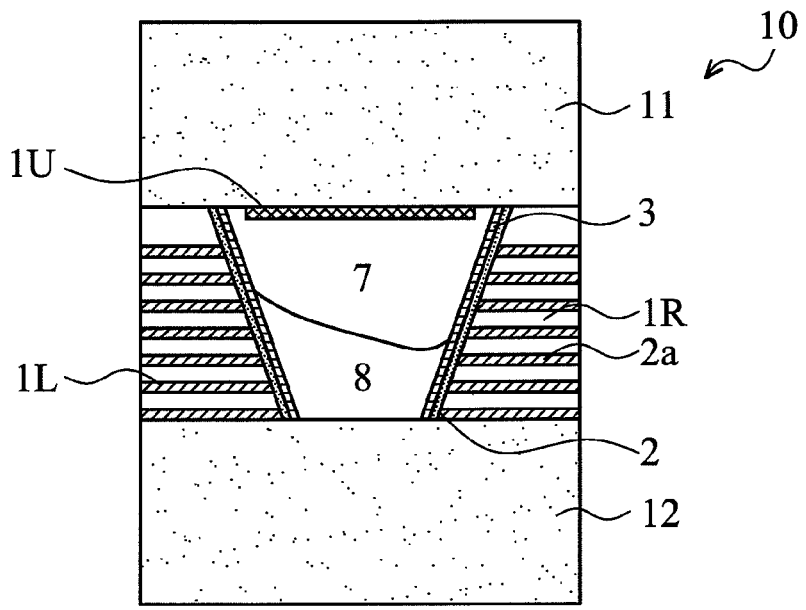

In FIG. 16A, the electrically switchable light-modulating cell 10 includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 16A, the discrete electrodes 1R and 1L and the dielectric layers 2a are alternately stacked to form the partition walls 5. A dielectric layer 2 is formed on a surface of the partition wall 5, and a hydrophobic layer 3 is formed on the dielectric layer. The dielectric layers 2a and the dielectric layer 2 can be composed of the same dielectric material, or different dielectric materials having different dielectric constants. The combination of the dielectric layers 2a and the discrete electrodes 1R and 1L provides a plurality of parallel potential lines distributed on the partition walls 5. The partition wall 5 with the hydrophobic layer 3 thereon is wettable by the second light-modulating medium 8. In addition, a top electrode 1U is optionally formed on the top substrate 11. As described above, the top electrode 1U can be a sheet or discrete electrodes.

Figure 16B:
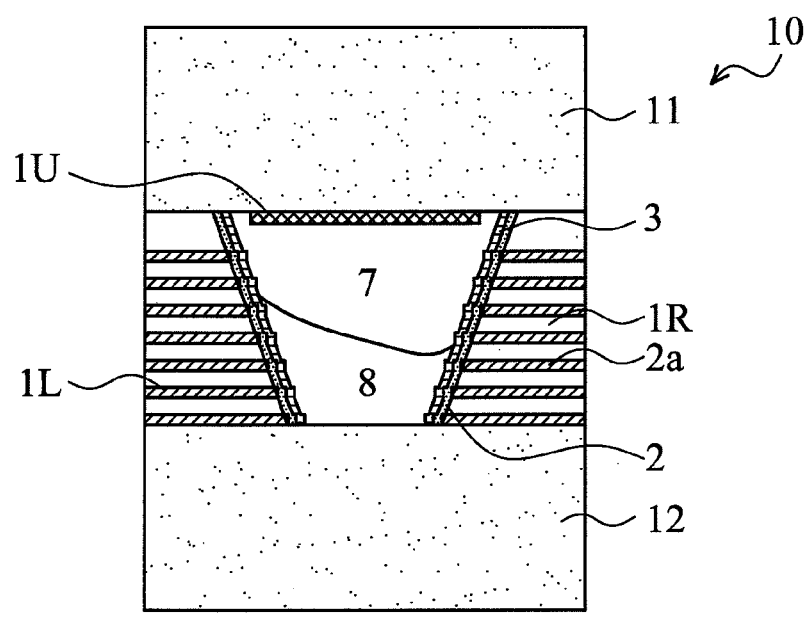

In FIG. 16B, the electrically switchable light-modulating cell 10 includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 16B, the discrete electrodes 1R and 1L and the dielectric layers 2a are alternately stacked to form the partition wall 5. A dielectric layer 2 is formed on a surface of the partition wall 5, and a hydrophobic layer 3 is conformally formed on the dielectric layer 2. The dielectric layers 2a and the dielectric layer 2 can be composed of the same dielectric material, or different dielectric materials having different dielectric constants. The combination of the dielectric layers 2a and the discrete electrodes 1R and 1L provides a plurality of parallel potential lines distributed on the partition walls 5. The hydrophobic layer 3 has a wave-shape to enhance the potential difference of the parallel potential lines. The partition wall 5 with the hydrophobic layer 3 thereon is wettable by the second light-modulating medium 8. In addition, a top electrode 1U is optionally formed on the top substrate 11. As described above, the top electrode 1U can be a sheet or discrete electrodes.

Figure 16C:
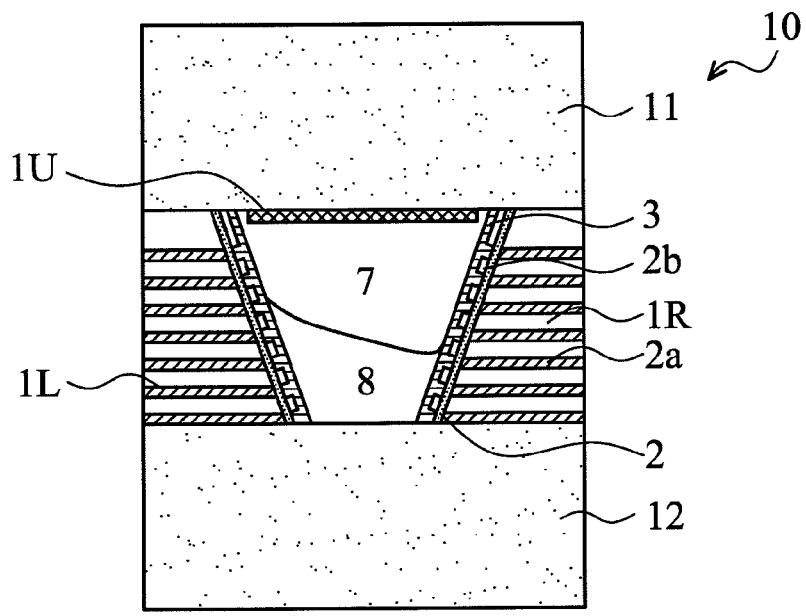

In FIG. 16C, the electrically switchable light-modulating cell 10 includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 16C, the discrete electrodes 1R and 1L and the dielectric layers 2a are alternately stacked to form the partition walls 5. A dielectric layer 2 is formed on a surface of the partition wall 5, discrete dielectric units 2b are formed on the dielectric layer 2, and a hydrophobic layer 3 is blanketly formed on the dielectric layer 2 and the discrete dielectric units 2b. The dielectric layer 2, the dielectric layers 2a, and the discrete dielectric units 2b can be composed of the same dielectric material, or different dielectric materials having different dielectric constants. The discrete dielectric units 2b, and the combination of the dielectric layers 2a and the discrete electrodes 1R and 1L provide a plurality of parallel potential lines distributed on the partition walls 5. The partition wall 5 with the hydrophobic layer 3 thereon is wettable by the second light-modulating medium 8. In addition, a top electrode 1U is optionally formed on the top substrate 11. As described above, the top electrode 1U can be a sheet or discrete electrodes.

Figure 16D:
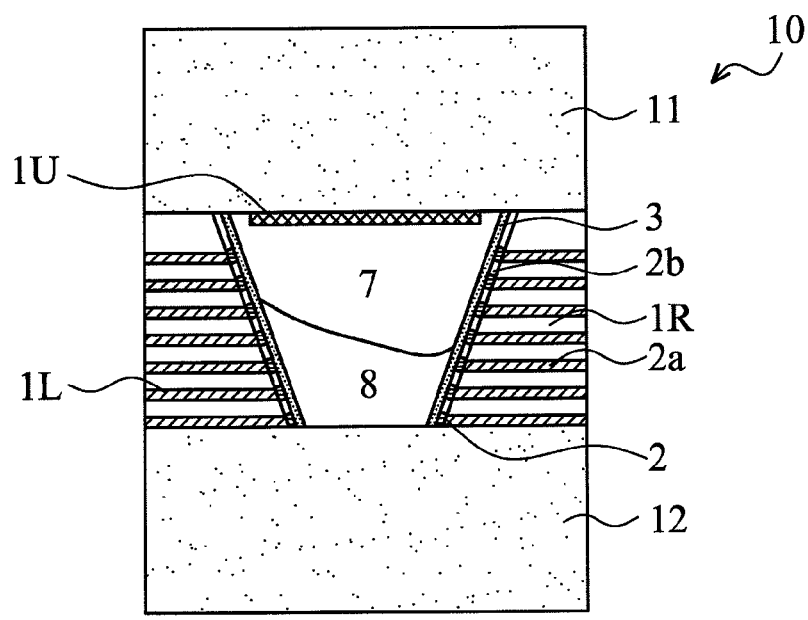

In FIG. 16D, the electrically switchable light-modulating cell 10 includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 16D, the discrete electrodes 1R and 1L and the dielectric layers 2a are alternately stacked to form the partition walls 5. A dielectric layer 2 and discrete dielectric units 2b are interlaced with each other and formed on a surface of the partition wall 5, and a hydrophobic layer 3 is formed on the discrete dielectric units 2b and the dielectric layer 2. The dielectric layer 2 and the discrete dielectric units 2b are composed of different dielectric materials having different dielectric constants. The combination of the discrete dielectric units 2b and the dielectric layer 2, and the combination of the dielectric layers 2a and the discrete electrodes 1R and 1L provide a plurality of parallel potential lines distributed on the partition walls 5. The partition wall 5 with the hydrophobic layer 3 thereon is wettable by the second light-modulating medium 8. In addition, a top electrode 1U is optionally formed on the top substrate 11. As described above, the top electrode 1U can be a sheet or discrete electrodes.

Figure 16E:
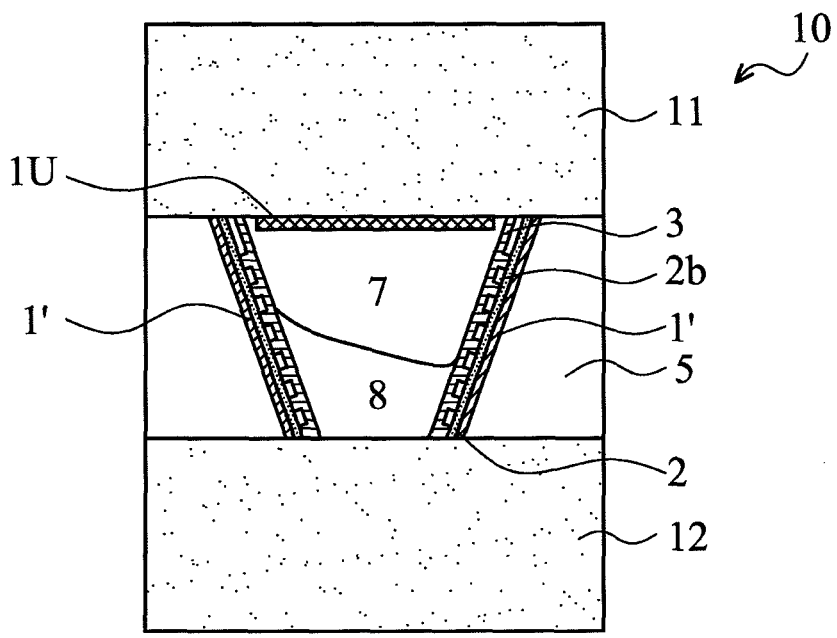

In FIG. 16E, the electrically switchable light-modulating cell 10 includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 16E, an electrode sheet 1' is formed on the partition walls 5. A dielectric layer 2 is formed on the electrode sheet 1', discrete dielectric units 2b are formed on the dielectric layer 2, and a hydrophobic layer 3 is blanketly formed on the discrete dielectric units 2b and the dielectric layer 2. The dielectric layer 2 and the discrete dielectric units 2b can be composed of the same dielectric material, or different dielectric materials having different dielectric constants. The discrete dielectric units 2b provide a plurality of parallel potential lines distributed on the partition walls 5. The partition wall 5 with the hydrophobic layer 3 thereon is wettable by the second light-modulating medium 8. In addition, a top electrode 1U is optionally formed on the top substrate 11. As described above, the top electrode 1U can be a sheet or discrete electrodes.

Figure 16F:
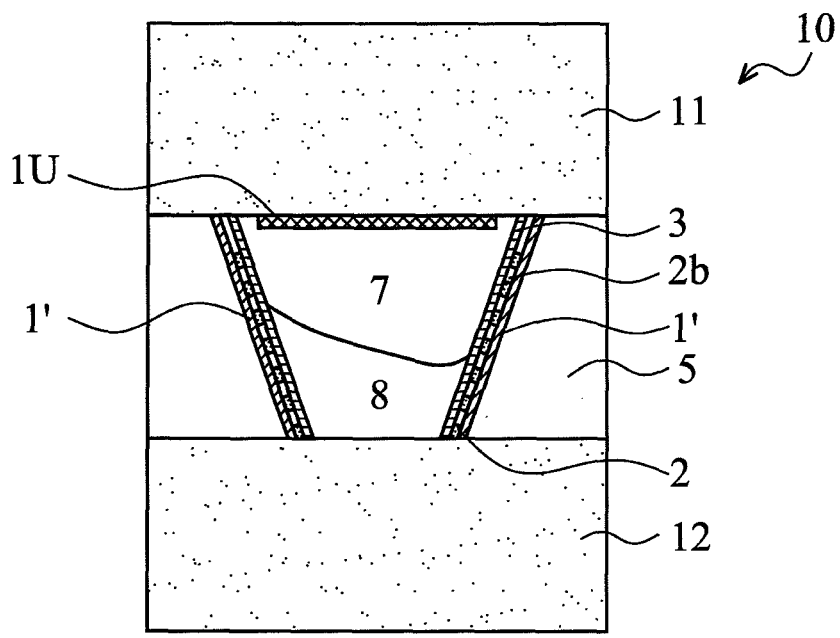

In FIG. 16F, the electrically switchable light-modulating cell 10 includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 16F, an electrode sheet 1' is formed on the partition walls 5. A dielectric layer 2 and discrete dielectric units 2b are interlaced with each other and formed on the electrode sheet 1', and a hydrophobic layer 3 is formed on the discrete dielectric units 2b and the dielectric layer 2. The dielectric layer 2 and the discrete dielectric units 2b are composed of different dielectric materials having different dielectric constants. The combination of the dielectric layer 2 and the discrete dielectric units 2b provides a plurality of parallel potential lines distributed on the partition walls 5. The partition wall 5 with the hydrophobic layer 3 thereon is wettable by the second light-modulating medium 8. In addition, a top electrode 1U is optionally formed on the top substrate 11. As described above, the top electrode 1U can be a sheet or discrete electrodes.

Figure 16G:
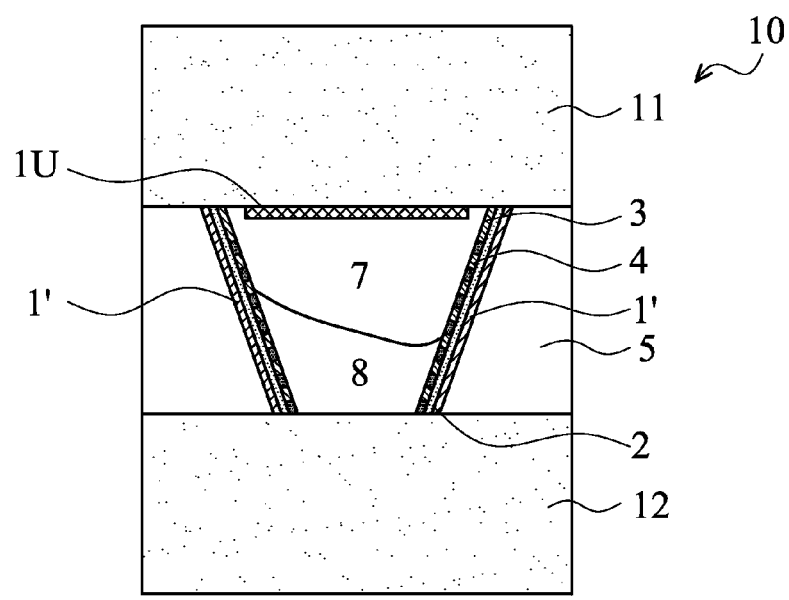

In FIG. 16G, the electrically switchable light-modulating cell 10 includes a bottom substrate 12, a partition wall 5 disposed on the bottom substrate 12, and a top substrate 11 disposed on the partition wall 5 and opposite to the bottom substrate 12. The bottom substrate 12, the top substrate 11, and the partition wall 5 define a compartment. A first and second light-modulating media 7 and 8 fill the compartment, and the first and second light-modulating media 7 and 8 are substantially immiscible and are of different refractive indices. In FIG. 16G, an electrode sheet 1' is formed on the partition walls 5. A dielectric layer 2 is formed on the electrode sheet 1', and a hydrophobic layer 3 and a hydrophilic layer 4 are interlaced with each other and formed on the dielectric layer 2. The combination of the hydrophobic layer 3 and the hydrophilic layer 4 provides a plurality of parallel potential lines distributed on the partition walls 5. Parts of the partition wall 5 with the hydrophobic layer 3 thereon are wettable by the second light-modulating medium 8, and parts of the partition wall 5 with the hydrophilic layer 4 thereon are wettable by the first light-modulating medium 7. In addition, a top electrode 1U is optionally formed on the top substrate 11. As described above, the top electrode 1U can be a sheet or discrete electrodes.

Figure 17A:
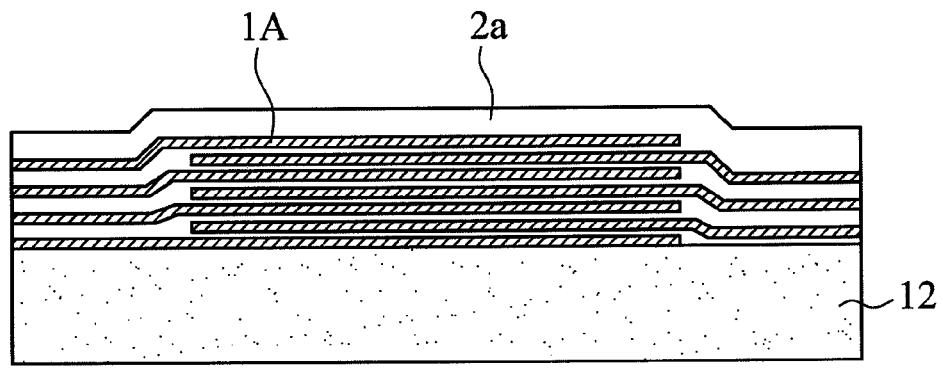
FIG. 17A-17D show cross-sectional views of manufacturing electrically switchable light-modulating cells and contact holes in one embodiment of the disclosure.
Figure 17B:
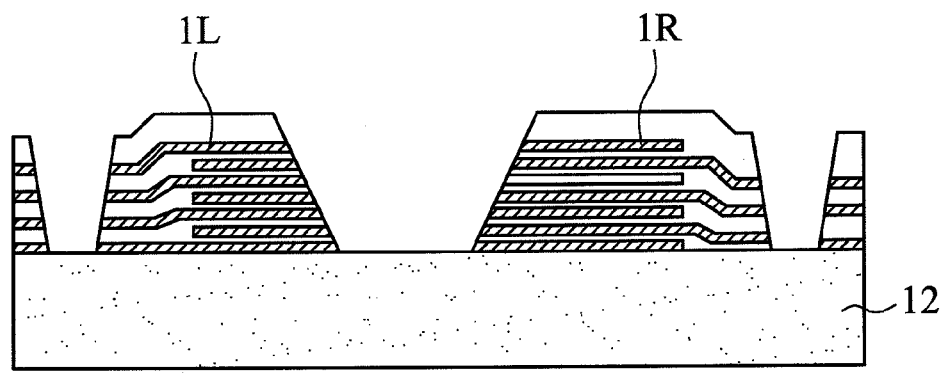
Figure 17C:
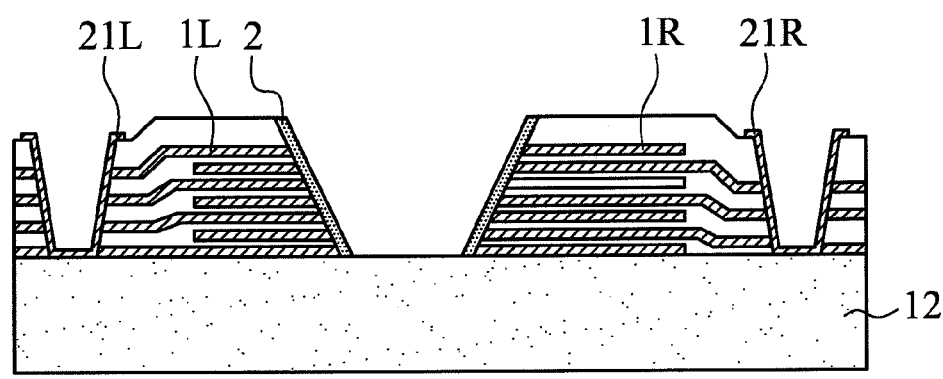
Figure 17D:
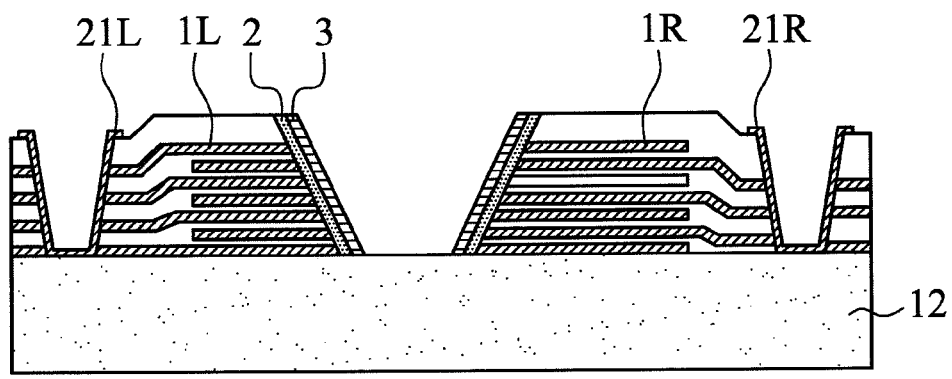
Figure 17E:
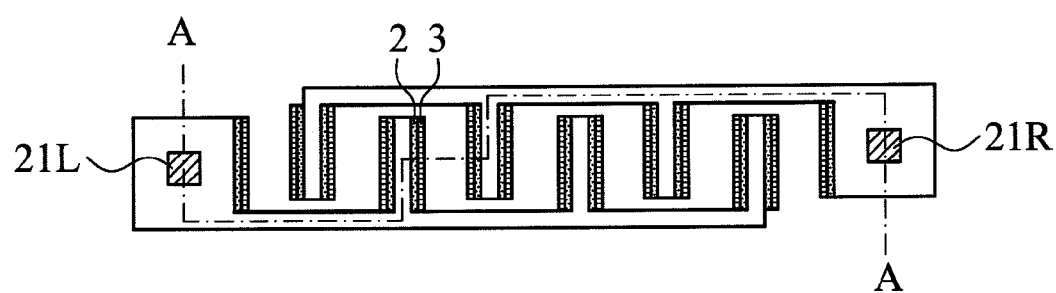
FIG. 17E shows a top view of the structure in FIG. 17D.
Figure 17F:
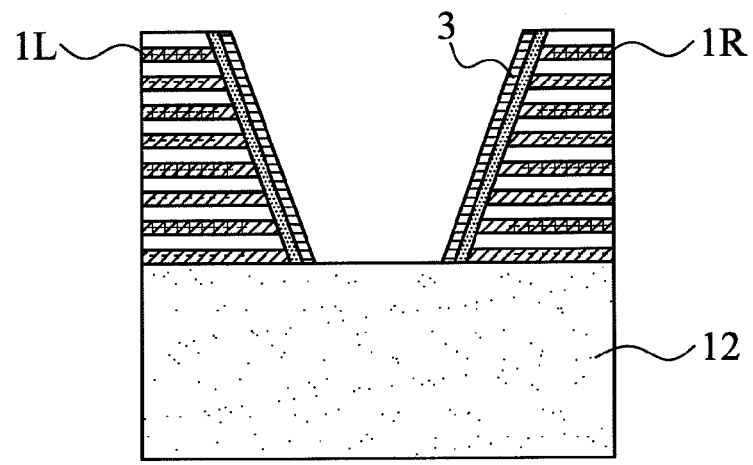
FIG. 17F shows a capacitor structure in the electrically switchable light-modulating cell of FIG. 17D.

The partition walls 5 composed of discrete dielectric units 2b and the discrete electrodes 1R and 1L in FIGS. 16A-16D can be manufactured as shown in FIGS. 17A-17D. As shown in FIG. 17A, a plurality of dielectric layers 2a and conductive layers 1A are alternately deposited on the bottom substrate 12. As shown in FIG. 17B, a part of the dielectric layers 2a and the conductive layers 1A are removed by laser ablation or lithography, thereby forming discrete electrodes 1R and 1L, dielectric layers 2a, compartments, and contact holes. As shown in FIG. 17C, a dielectric layer 2 is formed on sidewalls of the compartments, and conductive sheets 21R and 21L are formed on sidewalls of the contact holes. As shown in FIG. 17D, a hydrophobic layer 3 is formed on the dielectric layer 2. Thereafter, a top substrate with an optional top electrode 1U thereon is formed on the structure in FIG. 17D to complete an electrically switchable light-modulating cell, which may connect to external circuits through the contact holes. Obviously, the electrically switchable light-modulating cells are located in a display region, and the contact holes are located in peripheral region surrounding the display region. FIG. 17E shows a top view of the structure in FIG. 17D, and the A-A line in FIG. 17E has a cross-sectional view as shown in FIG. 17D. Furthermore, the discrete electrodes 1R and 1L can be separated into a first set of electrode lines and a second set of electrode lines. The first set of electrode lines are electrically connected to each other and applied with a positive potential, and the second set of electrode lines are electrically connected to each other and applied with a negative potential. As shown in FIG. 17F, the first and second set of electrode lines are alternately arranged with the dielectric layers 2a therebetween, thereby forming a plurality of capacitors.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrically switchable light-modulating cell, comprising:
   a first substrate;
   a partition wall, disposed on the first substrate;
   a second substrate, disposed on the partition wall and opposite to the first substrate, wherein the first substrate, the second substrate, and the partition wall define a compartment;
   a first and second light-modulating media fill the compartment, wherein the first and second light-modulating media are substantially immiscible and are of different refractive indices; and
   an electric potential difference generator, disposed on at least one of the first substrate, the partition wall, and the second substrate, wherein the electric potential difference generator provides a plurality of parallel potential lines distributed where the electric potential difference generator is located,
   wherein at least one of the first substrate, the second substrate, and the partition wall is wettable by at least one of the first and second light-modulating media, and
   wherein the first substrate comprises a via.

2. The electronically switchable light-modulating cell as claimed in claim 1, wherein the electric potential difference generator comprises a plurality of discrete electrode lines, and the plurality of parallel potential lines are generated in accordance with an electric potential difference across the plurality of discrete electrode lines.

3. The electronically switchable light-modulating cell as claimed in claim 2, further comprising a dielectric layer disposed on the plurality of discrete electrode lines.

4. The electronically switchable light-modulating cell as claimed in claim 3, further comprising a hydrophilic surface and a hydrophobic surface formed on the dielectric layer.

5. The electronically switchable light-modulating cell as claimed in claim 2, wherein the plurality of electrode lines are separated to a first set of electrode lines and a second set of electrode lines, wherein the first set of electrode lines are electrically connected to each other, and the second set of electrode lines are electrically connected to each other.

6. The electronically switchable light-modulating cell as claimed in claim 2, wherein a top view of the electric potential difference generator comprises a rectangular shape, a circular shape, a honeycomb shape, or a polygonal shape.

7. The electronically switchable light-modulating cell as claimed in claim 1, wherein the electric potential difference generator comprises an electrode, a plurality of dielectric units formed on the electrode, and a plurality of discrete dielectric units formed on the electrode, wherein the plurality of dielectric units and the plurality of discrete dielectric units are interlaced.

8. The electronically switchable light-modulating cell as claimed in claim 7, further comprising a hydrophobic surface formed on the plurality of dielectric units and the plurality of discrete dielectric units.

9. The electronically switchable light-modulating cell as claimed in claim 8, further comprising a hydrophilic surface formed on the plurality of dielectric units and the plurality of discrete dielectric units.

10. The electronically switchable light-modulating cell as claimed in claim 8, wherein the partition wall comprises a hydrophilic surface.

11. The electronically switchable light-modulating cell as claimed in claim 10, wherein the electric potential difference generator is disposed on the first substrate.

12. The electronically switchable light-modulating cell as claimed in claim 7, wherein a top view of the electric potential difference generator comprises a rectangular shape, a circular shape, a honeycomb shape, or a polygonal shape.

13. The electronically switchable light-modulating cell as claimed in claim 1, wherein the electric potential difference generator comprises an electrode, a dielectric layer formed on the electrode, and a plurality of discrete dielectric units separately formed on the dielectric layer.

14. The electronically switchable light-modulating cell as claimed in claim 13, further comprising a hydrophobic surface formed on the dielectric layer and the plurality of discrete dielectric units.

15. The electronically switchable light-modulating cell as claimed in claim 14, further comprising a hydrophilic surface formed on the dielectric layer and the plurality of discrete dielectric units.

16. The electronically switchable light-modulating cell as claimed in claim 14, wherein the partition wall comprises a hydrophilic surface.

17. The electronically switchable light-modulating cell as claimed in claim 16, wherein the electric potential difference generator is disposed on the first substrate.

18. The electronically switchable light-modulating cell as claimed in claim 16, wherein a top view of the electric potential difference generator comprises a rectangular shape, a circular shape, a honeycomb shape, or a polygonal shape.

19. The electronically switchable light-modulating cell as claimed in claim 1, further comprising a hydrophilic surface formed on at least one of the first substrate and the partition wall.

20. The electronically switchable light-modulating cell as claimed in claim 1, further comprising a conducting layer formed on the second substrate.

21. The electronically switchable light-modulating cell as claimed in claim 1, which further comprises a plurality of high-contact-angle material layer and low-contact-angle material layer formed on the electric potential difference generator to define the plurality of parallel potential lines.

22. The electronically switchable light-modulating cell as claimed in claim 1, wherein the first light-modulating medium is electro-conductive or polar.

23. The electronically switchable light-modulating cell as claimed in claim 1, wherein one of the first and second light-modulating media is capable of being driven by an electric potential difference from the electric potential difference generator.

\* \* \* \* \*